United States Patent
Chhabra et al.

(10) Patent No.: US 11,082,231 B2
(45) Date of Patent: Aug. 3, 2021

(54) INDIRECTION DIRECTORIES FOR CRYPTOGRAPHIC MEMORY PROTECTION

(71) Applicant: Intel Corporation, Santa Clara, CA (US)

(72) Inventors: Siddhartha Chhabra, Portland, OR (US); Vedvyas Shanbhogue, Austin, TX (US)

(73) Assignee: Intel Corporation, Santa Clara, CA (US)

( * ) Notice: Subject to any disclaimer, the term of this patent is extended or adjusted under 35 U.S.C. 154(b) by 252 days.

(21) Appl. No.: 15/859,295

(22) Filed: Dec. 29, 2017

(65) Prior Publication Data

US 2019/0044729 A1 Feb. 7, 2019

(51) Int. Cl.
| | |
|---|---|
| *H04L 9/32* | (2006.01) |
| *H04L 9/06* | (2006.01) |
| *G06F 12/14* | (2006.01) |
| *H04L 9/14* | (2006.01) |
| *H04L 9/08* | (2006.01) |
| *H04L 9/00* | (2006.01) |

(52) U.S. Cl.
CPC ........ *H04L 9/3242* (2013.01); *G06F 12/1408* (2013.01); *H04L 9/002* (2013.01); *H04L 9/0637* (2013.01); *H04L 9/0643* (2013.01); *H04L 9/0897* (2013.01); *H04L 9/14* (2013.01); *G06F 2212/1052* (2013.01)

(58) Field of Classification Search
CPC ..... H04L 9/3242; H04L 9/002; H04L 9/0637; H04L 9/0643; H04L 9/0897; H04L 9/14; G06F 12/1408; G06F 2212/1052

USPC ......................................................... 713/193
See application file for complete search history.

(56) References Cited

U.S. PATENT DOCUMENTS

| | | | | |
|---|---|---|---|---|
| 4,758,946 | A * | 7/1988 | Shar | G06F 12/1009 711/206 |
| 5,956,756 | A * | 9/1999 | Khalidi | G06F 12/1027 711/207 |
| 8,104,089 | B1 * | 1/2012 | Guo | G06F 12/14 713/188 |
| 8,688,954 | B2 * | 4/2014 | Davis | G11C 29/76 711/209 |
| 8,819,455 | B2 | 8/2014 | Chhabra et al. | |

(Continued)

OTHER PUBLICATIONS

Gueron, Shay, "A Memory Encryption Engine Suitable for General Purpose Processors", Cryptology ePrint Archive, Report 2016/204, 2016, accessed at: https://eprint.iacr.org/2016/204, 14 pages.

*Primary Examiner* — Shahriar Zarrineh
(74) *Attorney, Agent, or Firm* — Alliance IP, LLC

(57) ABSTRACT

A processer is provided that includes on-die memory, a protected memory region, and a memory encryption engine (MEE). The MEE includes logic to: receive a request for data in a particular page in the protected region of memory, and access a pointer in an indirection directory, where the pointer is to point to a particular metadata page stored outside the protected region of memory. The particular metadata page includes a first portion of security metadata for use in securing the data of the particular page. The MEE logic is further to access a second portion of the security metadata associated with the particular page from the protected region of memory, and determine authenticity of the data of the particular page based on the first and second portions of the security metadata.

18 Claims, 11 Drawing Sheets

(56) References Cited

U.S. PATENT DOCUMENTS

| | | | |
|---|---|---|---|
| 9,448,950 B2* | 9/2016 | Scarlata | G06F 21/74 |
| 9,934,148 B2* | 4/2018 | Roberts | G06F 12/0862 |
| 10,243,990 B1* | 3/2019 | Chen | G06F 21/71 |
| 2004/0093479 A1* | 5/2004 | Ramchandran | G06F 9/30014 |
| | | | 712/210 |
| 2005/0144388 A1* | 6/2005 | Newburn | G06F 12/0802 |
| | | | 711/118 |
| 2007/0130470 A1* | 6/2007 | Blom | G06F 21/86 |
| | | | 713/181 |
| 2009/0031142 A1* | 1/2009 | Halevi | G06F 12/1408 |
| | | | 713/190 |
| 2009/0198952 A1* | 8/2009 | Khmelnitsky | G06F 12/0246 |
| | | | 711/206 |
| 2010/0106920 A1* | 4/2010 | Anckaert | G06F 12/1408 |
| | | | 711/154 |
| 2010/0296651 A1* | 11/2010 | Tkacik | G09C 1/00 |
| | | | 380/44 |
| 2011/0153944 A1* | 6/2011 | Kursawe | G06F 12/0802 |
| | | | 711/122 |
| 2011/0202740 A1* | 8/2011 | Grisenthwaite | G06F 12/145 |
| | | | 711/163 |
| 2014/0101461 A1* | 4/2014 | Chhabra | G06F 21/71 |
| | | | 713/193 |
| 2014/0258805 A1* | 9/2014 | Casado | H03M 13/35 |
| | | | 714/758 |
| 2014/0380009 A1* | 12/2014 | Lemay | G06F 12/145 |
| | | | 711/163 |
| 2015/0089173 A1* | 3/2015 | Chhabra | G06F 12/1408 |
| | | | 711/163 |
| 2016/0085695 A1* | 3/2016 | Leslie-Hurd | G06F 21/79 |
| | | | 711/163 |
| 2016/0117265 A1* | 4/2016 | Mckeen | G06F 12/1408 |
| | | | 711/102 |
| 2016/0179702 A1* | 6/2016 | Chhabra | G06F 13/1605 |
| | | | 713/193 |
| 2016/0328335 A1* | 11/2016 | Bhattacharyya | H04L 9/3242 |
| 2017/0293534 A1* | 10/2017 | Auvenshine | G06F 11/1464 |
| 2017/0337136 A1* | 11/2017 | Basu | G06F 12/1009 |
| 2018/0211046 A1* | 7/2018 | Muttik | G06F 21/577 |
| 2018/0365141 A1* | 12/2018 | Dragojevic | G06F 12/0246 |

* cited by examiner

INDIRECTION DIRECTORIES FOR CRYPTOGRAPHIC MEMORY PROTECTION

TECHNICAL FIELD

This disclosure relates in general to the field of computer security and, more particularly, to securing memory using counter mode encryption.

BACKGROUND

Computing systems, such as hardware systems and software systems that run on computers often have undetected flaws that can be exploited by hardware attacks or software attacks, such as malicious computer programs that are received over the Internet or other communication networks. The hardware attacks and software attacks can include Trojans, viruses, worms, spyware, and other malware. Many existing computer security systems combat hardware attacks and software attacks by attempting to prevent the attacks from compromising any part of the computer system. Computing systems may be provided with features to protect sensitive data in memory from both hardware attacks and software attacks. Some processors provide cryptographic mechanisms for encryption, integrity, and replay protection. Memory encryption protects the confidentiality of memory-resident data. Integrity protection prevents an attacker from causing any hidden modifications to the ciphertext (i.e., encrypted data, as opposed to plaintext that is unencrypted data) in memory. Replay protection eliminates any undetected temporal substitution of the ciphertext. In the absence of encryption, integrity, and replay protections, an attacker with physical access to the system can record snapshots of cache lines and replay the cache lines at a later point in time to modify the cache lines and attack the computer system.

BRIEF DESCRIPTION OF THE DRAWINGS

Like reference numbers and designations in the various drawings indicate like elements.

DETAILED DESCRIPTION OF EXAMPLE EMBODIMENTS

Figure 1:
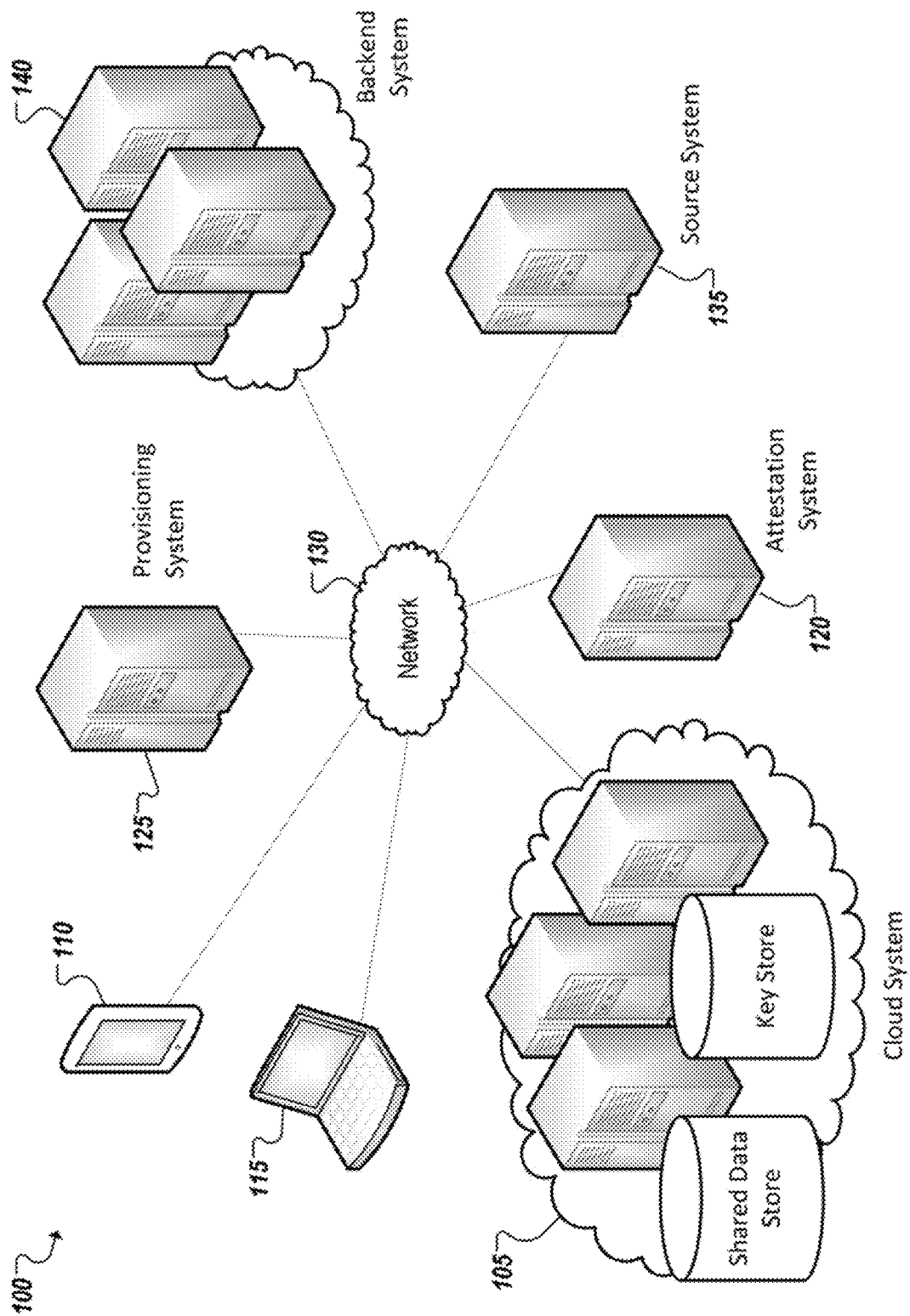
FIG. 1 is a simplified schematic diagram of an example system including a host system to host one or more secure enclaves in accordance with one embodiment.

FIG. 1 is a simplified block diagram illustrating an example embodiment of a computing environment 100 including a network of computing devices, at least some of which include logic, implemented in hardware circuitry, firmware, and/or software to implement a counter mode encryption scheme to protect data within the system. Protected memory regions may be implemented utilizing such functionality. As one example, illustrated in FIG. 1, a cloud-based computing system 105 can be implemented to facilitate on-demand and distributed computing resource, which in some cases may be made available to various consumers. The cloud system 105 may include multiple computing resources, which may be selectively utilized to host various applications, data, and services. For instance, the cloud system 105 may be composed of multiple, distinct host computing systems, which may each be used to host one or more virtual resources. A virtual resource, within this disclosure, may refer to a virtual machine, container, or other virtual execution environment in which another software application, program, microservice, or software component may be hosted and run. In some implementations, virtual resources may emulate a private server (e.g., of a customer or other consumer), and the virtual machines may be deployed to host various applications and services. The cloud system 105 may include a controller, or scaling manager, to allow the amount of resources of the cloud dedicated to a particular application, service, and/or consumer to be scaled-up (i.e., allocate more resources to the service) to adjust to increasing demand (or a predicted increase in demand). Likewise, the scaling manager may scale-down (i.e., subtract) the cloud system resources of an application in response to a real or predicted decrease in demand for the application, among other examples.

In some cases, one or more consumer source systems (e.g., 135) may interact with cloud system 105 resources or other host systems 110, 115 to act as a source for various applications, data, virtual machine images, and even secrets and keys. For instance, a source system 135 may provide at least a portion of a virtual machine image to run a particular application instance to cloud system 105 in connection with the hosting and scaling of the particular application on the cloud system 105. Likewise, the source system may allow consumers to specify particular secret data and/or keys, which a particular consumer may desire to be used in connection with an application and/or virtual machine sourced from the source system 135, among other examples.

In some implementations, a cloud system may include host computing systems (or platforms) to be equipped with functionality to support secure logical components, or enclaves, to allow virtual machines to be hosted, which themselves include such secure enclaves, allowing applications and data hosted on the virtual machine to be secured through one or more secure enclaves implemented using a counter mode encryption scheme. Indeed, the virtual machine of such a system may likewise include secure enclaves. A secure enclave may be embodied as a set of instructions (e.g., implemented in microcode or extended microcode) that provides a safe place for an application to execute code and store data inside in the context of an operating system (OS) or other process. An application that executes in this environment may be referred to as an enclave. Enclaves are executed from a secure enclave cache. In some implementations, pages of the enclave may be loaded into the cache by an OS. Whenever a page of an enclave is removed from the secured cache, cryptographic protections may be used to protect the confidentiality of the enclave and to detect tampering when the enclave is loaded back into the cache, such as discussed herein. Inside the cache, enclave data may be protected using access control mechanisms provided by the processor. The enclave cache may be where enclave code is executed and protected enclave data is accessed.

In some implementations, a secure memory region can implement memory for use in secure enclaves, or the enclave cache. Accordingly, the enclave cache may be located within the physical address space of a platform but can be accessed only using secure enclave instructions. A single enclave cache may contain pages from many different enclaves and provides access control mechanism to protect the integrity and confidentiality of the pages. The enclave cache can be instantiated in several ways. For instance, the cache may be constructed of dedicated SRAM on the processor package. The enclave cache may be implemented in cryptographically protected volatile storage using platform DRAM. The cache may use one or more strategically placed cryptographic units in the CPU uncore to provide varying levels of protection. The various uncore agents may be modified to recognize the memory accesses going to the cache, and to route those accesses to a crypto controller located in the uncore. The crypto controller, depending on the desired protection level, generates one or more memory accesses to the platform DRAM to fetch the cipher-text. It may then process the cipher-text to generate the plain-text, and satisfy the original cache memory request, among other example implementations and features.

In some implementations, when a platform loads an enclave it may call a system routine in the operating system. The system may attempt to allocate some pages in the enclave cache. In some implementations, if there is no open space in the cache, the OS may select some protected cache lines for removal, such as through the removal of a corresponding "victim" enclave. In some implementations, additional secure memory may be allocated (e.g., by expanding the secure memory region) by converting pages to secured pages. Likewise, the system may add secure enclaves control structure (SECS) to the cache. With the SECS created, the system may add pages to the enclave as requested by the application. A secure enclave SECS is said to be active if it is currently loaded into the cache. In some implementations, a secure enclave may be implemented in a virtual machine. A corresponding OS, virtual machine manager (VMM), etc., may be responsible for managing what gets loaded into the EPC. In some implementations, while loading an enclave page into the EPC, the OS/VMM may inform the CPU the whereabouts of the SECS for that page, except when the page under consideration itself is an SECS. When the page being loaded is not an SECS, the SECS corresponding to the page may be located inside the EPC. Before loading any page for an enclave, the OS/VMM may load the SECS for that enclave into the EPC.

Secure enclaves may be used, in some instances, to seal, or secure, private or secret data utilized by an application or virtual machine, for instance, by encryption using hardware-based or other encryption keys. In some implementations, a specialized secure enclave may be provided to manage keys for a virtual machine (e.g., in connection with a key store provided on the cloud system 105). Secure enclaves may be further utilized to perform attestation of various components of a virtual machine and the application(s) it hosts. Attestation may be the process of demonstrating that a piece of software has been established on the platform especially to a remote entity. In the case of secure enclaves, attestation is the mechanism by which a remote platform establishes that software is running on an authentic (i.e., secure enclave enabled) platform protected within an enclave prior to trusting that software with secrets and protected data. The process of attestation can include measurement of the secure enclave and its host, storage of the measurement results (e.g., in a corresponding SECS), and reporting of measurements (with potentially additional information) through quotes to prove the authenticity of the secure enclave to another entity.

In some implementations, one or more attestation systems (e.g., 120) may be provided, which may receive attestation data, or "quotes," generated by secure enclaves running on host systems of the cloud system 105 or even other non-cloud host systems (e.g., 110, 115) to prove or attest to the authenticity and security (and other characteristics) of another application or enclave of the host. An attestation system 120 may process data, including signatures, included in the quote to verify the trustworthiness of the secure enclave (and its platform) and confirm the attestation based on the received quote.

In general, host systems (e.g., 105, 110, 115) can host applications and services and attestation of the host system may be utilized to establish the trustworthiness of both an application or service, a secure enclave provided on the host, as well as the host system itself. In the case of applications or services implemented through one or more virtual machines hosted on one or more host systems (e.g., of cloud system 105), secure enclaves may likewise be provided in the virtual machines and the applications they host to similarly allow these "host" virtual machines (and their applications) to reliably and securely attest to their authenticity and trustworthiness. As noted, attestations may be facilitated through quotes that identify attributes of the system, an application, and/or an enclave that is being attested to through the quote. The quote may additionally be signed or include data that has been signed by a cryptographic key (or key pair), cipher, or other element (collectively referred to herein as "key") from which the attestation system can authenticate or confirm the trustworthiness of the quote (and thereby also the application or enclave attested to by the quote). Such keys can be referred to as attestation keys. A provisioning system 125 can be utilized to securely provision such attestation keys on the various host devices (e.g., 105, 110, 115), virtual machines, and/or enclaves. Provisioning systems and services may also be utilized to facilitate the provisioning or generation of sealing keys for use in sealing secret data generated or entrusted to an application or virtual machine. Such secret data may be sealed (e.g., in a shared storage element within the cloud system 105) such that it may securely maintained and made available for later access, such as when a virtual machine and application are deconstructed, or scaled-down, and later re-instantiated during scale-up, among other examples.

In some cases, attestation can be carried out in connection with a client-server or frontend-backend interaction (e.g., over one or more networks 130) between an application hosted on a host system (e.g., 105, 110, 115) and a backend service hosted by a remote backend system (e.g., 140).

Sensitive data and transactions can take place in such interactions and the application can attest to its trustworthiness and security to the backend system (and vice versa) using an attestation system (e.g., 120). In some implementations, the attestation system itself can be hosted on the backend system. In other cases, a backend system (e.g., 140) (or even another host device in a peer-to-peer attestation) can consume the attestation services of a separate attestation system (e.g., 105). Attestation to a backend system 140 can facilitate access to higher privileges, sensitive data, keys, services, etc. that are restricted to other systems unable to attest to their trust level. Indeed, secret data maintained at an application may include secrets entrusted with an application or virtual machine by a backend service (e.g., 140) based on successful attestation of the application or virtual machine, among other examples.

A provisioning system 125 can maintain a database or other repository of certificates mapped to various host platforms (e.g., 105, 110, 115) or virtual machines equipped to implement trusted execution environments, or secure enclaves. Each of the certificates can be derived from keys, such as root keys, established for the host devices or virtual machines. Such keys may themselves be based on persistently maintained, secure secrets provisioned on the host devices during manufacture. In the case of virtual machines or platforms employing multiple devices (e.g., such as a server architecture) the secret may be established for the virtual machine and platform and registered with a registration system 130, among other examples. The root keys or secrets remain secret to the host platform or virtual machine and may be implemented as fuses, a code in secure persistent memory, among other implementations. The key may be the secret itself or a key derived from the secret. The certificate may not identify the key and the key may not be derivable from the certificate, however, signatures produced by the key (e.g., and included in a quote) may be identified as originating from a particular one of the host platforms or virtual machines for which a certificate is maintained based on the corresponding certificate. In this manner, a host system (e.g., 105, 110, 115) or virtual machines hosted thereon can authenticate to the provisioning system 125 and be provided (by the provisioning system 125) with attestation keys, root keys, sealing keys, and other cryptographic structures, which the provisioning system 125 may further and securely associate with the host device or virtual machine. These attestation keys can then be used by secure enclaves on the corresponding host systems (e.g., 105, 110, 115) or virtual machine to perform attestation for one or more applications or enclaves present on the host device.

Various host platforms may interact with an attestation system (e.g., 120), provisioning systems (e.g., 125), source system (e.g., 135), and backend systems (e.g., 140) over one or more networks (e.g., 130). Networks 130, in some implementations, can include local and wide area networks, wireless and wireline networks, public and private networks, and any other communication network enabling communication between the systems. Further, two or more of attestation systems (e.g., 120), provisioning systems (e.g., 125), and backend systems (e.g., 140) may be combined in a single system. Communications over the networks 130 interconnecting these various systems (e.g., 105, 110, 115, 120, 125, 135, 140) may be secured. In some cases, a secure enclave on a host (e.g., 105, 110, 115, etc.) may initiate a communication with an attestation system 120, provisioning systems (e.g., 125), and/or source systems (e.g., 135) using a secure channel, among other examples.

In general, "servers," "devices," "computing devices," "host devices," "user devices," "clients," "servers," "computers," "platforms," "environments," "systems," etc. (e.g., 105, 110, 115, 120, 125, 135, 140, etc.) can include electronic computing devices operable to receive, transmit, process, store, or manage data and information associated with the computing environment 100. As used in this document, the term "computer," "computing device," "processor," or "processing device" is intended to encompass any suitable processing device adapted to perform computing tasks consistent with the execution of computer-readable instructions. Further, any, all, or some of the computing devices may be adapted to execute any operating system, including Linux, UNIX, Windows Server, etc., as well as virtual machines adapted to virtualize execution of a particular operating system, including customized and proprietary operating systems. Computing devices may be further equipped with communication modules to facilitate communication with other computing devices over one or more networks (e.g., 130).

Host devices (e.g., 110, 115) can further include computing devices implemented as one or more local and/or remote client or end user devices, such as application servers, personal computers, laptops, smartphones, tablet computers, personal digital assistants, media clients, web-enabled televisions, telepresence systems, gaming systems, multimedia servers, set top boxes, smart appliances, in-vehicle computing systems, and other devices adapted to receive, view, compose, send, or otherwise interact with, access, manipulate, consume, or otherwise use applications, programs, and services served or provided through servers within or outside the respective device (or environment 100). A host device can include any computing device operable to connect or communicate at least with servers, other host devices, networks, and/or other devices using a wireline or wireless connection. A host device, in some instances, can further include at least one graphical display device and user interfaces, including touchscreen displays, allowing a user to view and interact with graphical user interfaces of applications, tools, services, and other software of provided in environment 100. It will be understood that there may be any number of host devices associated with environment 100, as well as any number of host devices external to environment 100. Further, the term "host device," "client," "end user device," "endpoint device," and "user" may be used interchangeably as appropriate without departing from the scope of this disclosure. Moreover, while each end user device may be described in terms of being used by one user, this disclosure contemplates that many users may use one computer or that one user may use multiple computers, among other examples.

A host system (e.g., 105) can be further configured to host one or more virtual machines. For instance, a host device may include a virtual machine monitor (VMM) and/or hypervisor, which may be utilized to host virtual machines on the host device. A host device may additional include or set aside encrypted or otherwise secured memory to facilitate secured enclaves, including secured enclaves to be hosted on or in connection with one or more virtual machines hosted on the host system (e.g., 105), among other examples.

While FIG. 1 is described as containing or being associated with a plurality of elements, not all elements illustrated within system 100 of FIG. 1 may be utilized in each alternative implementation of the present disclosure. Additionally, one or more of the elements described herein may be located external to system 100, while in other instances, certain elements may be included within or as a portion of one or more of the other described elements, as well as other elements not described in the illustrated implementation. Further, certain elements illustrated in FIG. 1 may be combined with other components, as well as used for alternative or additional purposes in addition to those purposes described herein.

Figure 2:
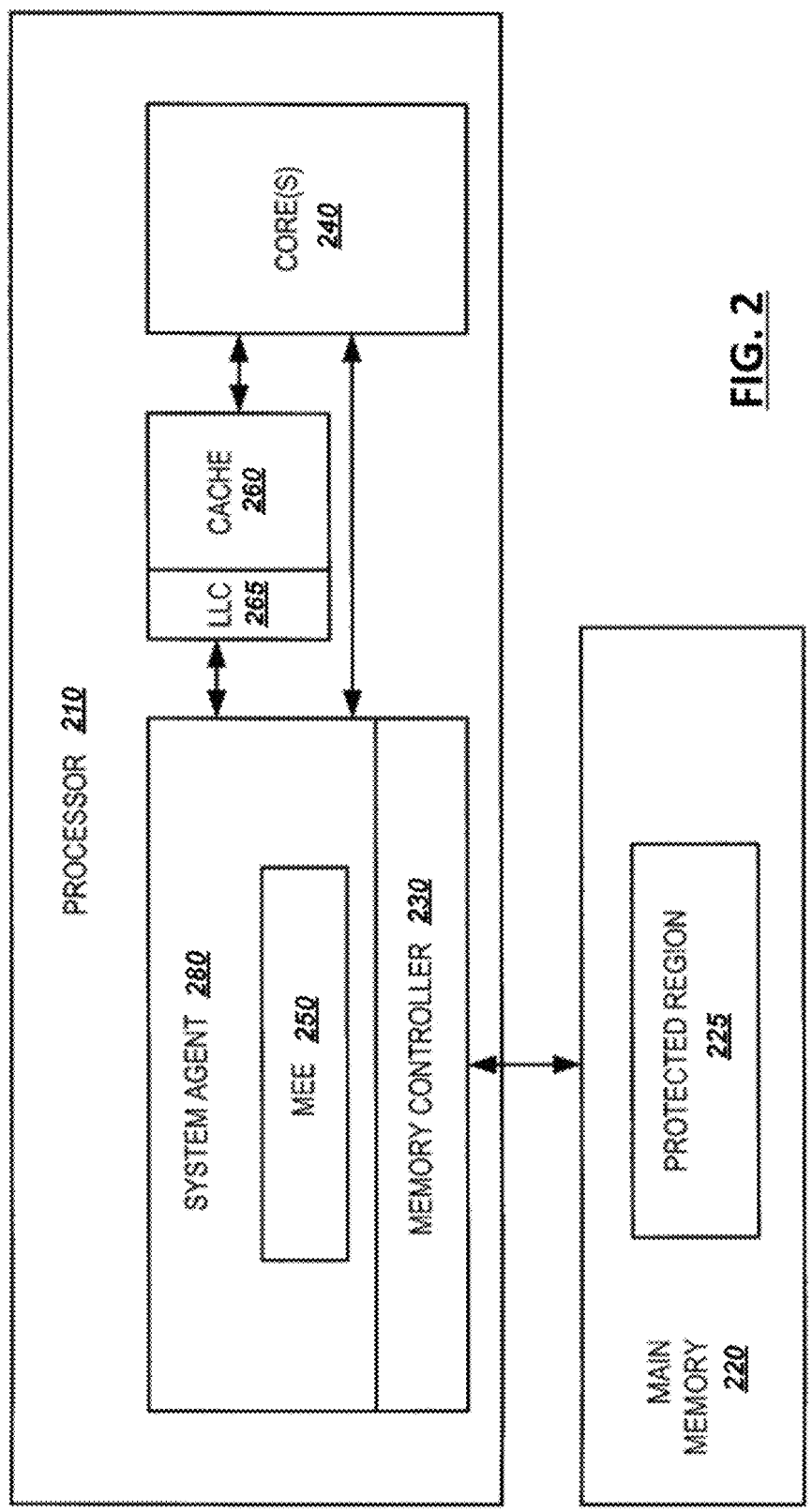
FIG. 2 is a simplified block diagram of an example device including a processor and a memory encryption engine in accordance with one embodiment.

Turning to the example of FIG. 2, a simplified block diagram 200 is shown illustrating at least a portion of a computing device to implement cryptographic protection within an example computing environment. For instance, an embodiment of a computing device may include a data processor 210 that executes memory encryption operations for confidentiality, integrity and replay protections. The processor 210 may be used in a computing device implementing systems such as a desktop computer, a tablet computer, a laptop computer, a netbook, a notebook computer, a personal digital assistant (PDA), a server, a workstation, a cellular telephone, a mobile computing device, a smart phone, an Internet appliance or any other type of computing device. In another embodiment, the processor 210 may be used in a system on a chip (SOC) system.

The processor 210 includes one or more processing cores 240 to execute instructions of the system. A processing core (e.g., 240) may include, for instance, pre-fetch logic to fetch instructions, decode logic to decode the instructions, execution logic to execute instructions and the like. The processor 210 includes a cache 260 to cache instructions and/or data. The cache 260 may include, for instance, level one, level two, and a last level cache (LLC) 265, or any other configuration of the cache memory within the processor 210.

In one example, a memory controller 230 may be provided that is configured to perform functions that enable the processor 210 to access and communicate with a main memory 220 that includes a volatile memory and/or a non-volatile memory. In one embodiment, the memory controller 230 is coupled to a system agent 280 that includes a memory encryption engine (MEE) 250. In one embodiment, the MEE 250 is located between the last level cache 265 and the memory controller 230 to perform encryption, decryption and authentication of the data lines moving in and out of a protected region 225 of the main memory 220. In the example of FIG. 2, the MEE 250 is located on the processor die, while the memory 220 is located off the processor die.

According to one embodiment of the invention, the MEE 250 includes logic implemented in hardware circuitry and/or firmware to process multiple memory read requests in parallel to improve the access latency to the protected region 225. The MEE 250 performs counter mode encryption in which the encryption seed (or "version" value) is unique to a data line both temporally and spatially. As described before, spatial uniqueness can be achieved by using the address of the data line to be accessed, while temporal uniqueness can be achieved by using a counter that serves as the version of the data line. In one embodiment, the MEE 250 also protects the data lines in the protected region 225 of the main memory 220 using a counter tree structure (also referred to herein as "replay integrity tree", "replay tree", and "integrity tree"). The MEE may also preserve integrity of protected data (and lines of the counter tree structure) through message integrity codes, such as message authentication codes (MACS). The versions of the data lines are part of this counter tree structure. An embodiment of the counter tree structure is described, for instance, in association with FIG. 4, as set forth below. The version, MAC(s), and integrity tree data used to implement an example counter mode encryption scheme may embody security metadata. In some implementations, a portion of the security metadata may be located in the protected region 225 itself, while other portions of the security metadata are located outside the protected region 225 (e.g., allocated on demand to limit "stolen" memory from the protected region 225, among other example implementations and considerations.

Figure 3:
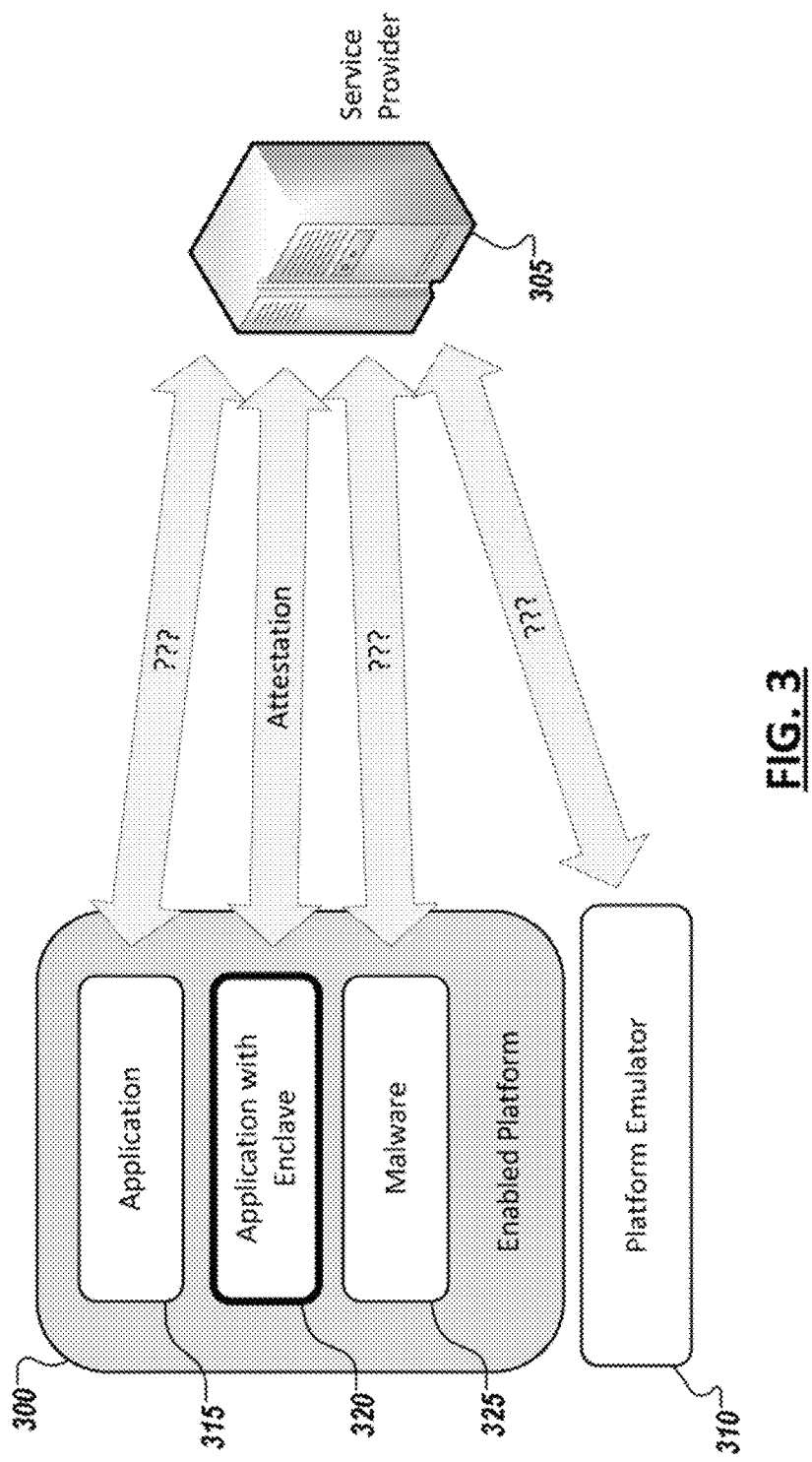
FIG. 3 is a simplified block diagram representing application attestation in accordance with one embodiment.

As introduced above in the discussion of the example of FIG. 1, cache lines of data in pages of memory within the protected region 225 may be allocated for use in connection with secure enclaves implemented using a computing system equipped with functionality such as introduced in the example of FIG. 2. For instance, turning to FIG. 3, an application enclave can be provided on an application (e.g., 300) to protect all or a portion of a given application and allow the application (and its security features) to be attested to. For instance, a service provider 305, such as a backend service or web service, may prefer or require that clients, with which it interfaces, possess certain security features or guarantees, such that the service 305 can verify that it is transacting with who the client says it is. For instance, malware (e.g., 325) can sometimes be constructed to spoof the identity of a user or an application in an attempt to extract sensitive data from, infect, or otherwise behave maliciously in a transaction with the service 305. Signed attestation (or simply "attestation") can allow an application (e.g., 320) to verify that it is a legitimate instance of the application (i.e., and not malware). Other applications (e.g., 320) that are not equipped with a secure application enclave may be legitimate, but may not attest to the service provider 305, leaving the service provider in doubt, to some degree, of the application's authenticity and trustworthiness. Further, host system platforms (e.g., 300) can be emulated (e.g., by emulator 310) to attempt to transact falsely with the service 305. Attestation through a secure enclave can guard against such insecure, malicious, and faulty transactions.

As a general matter, a computing platform equipped with logic to implement secured memory regions for use by secure enclaves (and other uses) may allow software to run in a trustworthy manner and handle secret data. This can protect against malicious actors, including those which have full control of the system, and the software running on it at any privilege level, and can read or modify the contents of the DRAM (including copy-and-replay). For instance, the computing platform may define a trust region that only includes the CPU internals. A set of CPU instructions may be provided with the platform, which are supported by a hardware-based access control mechanism to provide for loading application code and data from memory, while incrementally locking it in a dedicated secured memory (e.g., DRAM) region, and generating its cryptographic measurement. After the code is loaded, it can run in a special mode as a secure enclave, remaining isolated from all other processes on the system (e.g., as governed by the access control mechanism). Accordingly, such computing platforms may enable a secret owner to provision a secret to a trustworthy enclave. The trusted enclave can prove to an off-platform entity (or to another enclave on the same platform) that it is running on a genuine processor including such security functionality and that the value it reports for its cryptographically measured identity is trustworthy.

In some implementations, attestation can be provided on the basis of a signed piece of data, or "quote," that is signed using an attestation key securely provisioned on the platform or virtual machine hosting the application. For instance, an application (e.g., 320) may be provided that is provided with a secure application enclave for securely maintaining data and/or securely communicating in transactions with a backend system 305. Additional secured enclaves can be provided (i.e., separate from the secure application enclave) to measure or assess the application and its enclave, sign the measurement (included in the quote), and assist in the provisioning one or more of the enclaves with keys for use in signing the quote and establishing secured communication channels between enclaves or between an enclave and an outside service or system (e.g., 305). For instance, one or more provisioning enclaves can be provided to interface with a corresponding provisioning system to obtain attestation keys for use by a quoting enclave and/or application enclave. One or more quoting enclaves can be provided to reliably measure or assess an application and/or the corresponding application enclave and sign the measurement with the attestation key obtained by the provisioning enclave through the corresponding provisioning service system, among other examples.

Through attestation, a trusted channel may be established with an identified enclave to provision a secret onto the enclave. For handling provisioned secrets, a secured computing platform (such as illustrated in FIG. 2) may be provided with additional instructions that allow an enclave to encrypt any information with a secret key that is unique to the platform and to its identity. Thus, an enclave can safely store (and retrieve) secrets on untrusted locations (e.g., a disk). As introduced above, protected memory regions may be provided to enable the secure handling of secrets. To trust an enclave's cryptographic identity, its intended execution flow, and the attestation protocol, the corresponding pages of memory allocated to and used by the enclave are secured to be tamper resistant and replay protected. A memory encryption engine (MEE) (e.g., 250), which delivers the protection for a protected memory region (e.g., 225). In some implementations, the MEE may implement security through an integrity tree, the cryptographic primitives that realize the encryption, a Message Authentication Code (MAC), and an anti-replay mechanism.

In some implementations, an integrity tree may be implemented based on the principle that only on-die resources are considered trusted. As internal, on-die storage is limited and expensive, only a portion of the integrity tree may be stored on-die, while remaining portions of the integrity tree are stored in protected memory. Different integrity trees use various combinations of counters and MAC tags (or hashes), offering tradeoffs between the size of the internal storage and the amount of protected memory, the cost/complexity of the tree "walk" verification flows, and the resulting performance. In some implementations, the MEE may implement schemes enabling a parallelizable encryption mode, a MAC algorithm that produces short MAC tags with a cheap hardware implementation, among other example feature.

Internal memory (or cache) of an example processor may be relatively small and may be accessed much faster than the system memory. During normal operation, memory transactions may be continuously issued by the processor's core(s) (e.g., 240), and transactions that miss the cache may be handled by the memory controller (e.g., 230). The MEE 250, in some implementations, may operate as an extension of the memory controller 230, taking over the cache-system memory (e.g., DRAM) traffic that points to the protected region 225 of memory. An additional portion of the memory, called the "seized" or "stolen" region, accommodates the MEE's integrity tree. The union of these regions may be referred to as the "MEE region" forming a range of physical addresses that is fixed to some size at boot time (e.g., 128 MB), in a trustworthy way. In some cases, the entirety of the MEE region may be referred to as the protected or secured memory region. Read/write requests to the protected region may be routed by the memory controller 230 to the MEE 250, which encrypts (or decrypts) the data before sending (fetching) it to (from) the DRAM. The MEE may autonomously initiate additional transactions to verify (or update) the integrity tree, such as based on a construction of counters and MAC tags (also referred to as embedded MACs). The self-initiated transactions access the seized region on the DRAM, and also some on-die array that serves as the root of the tree.

Figure 4:
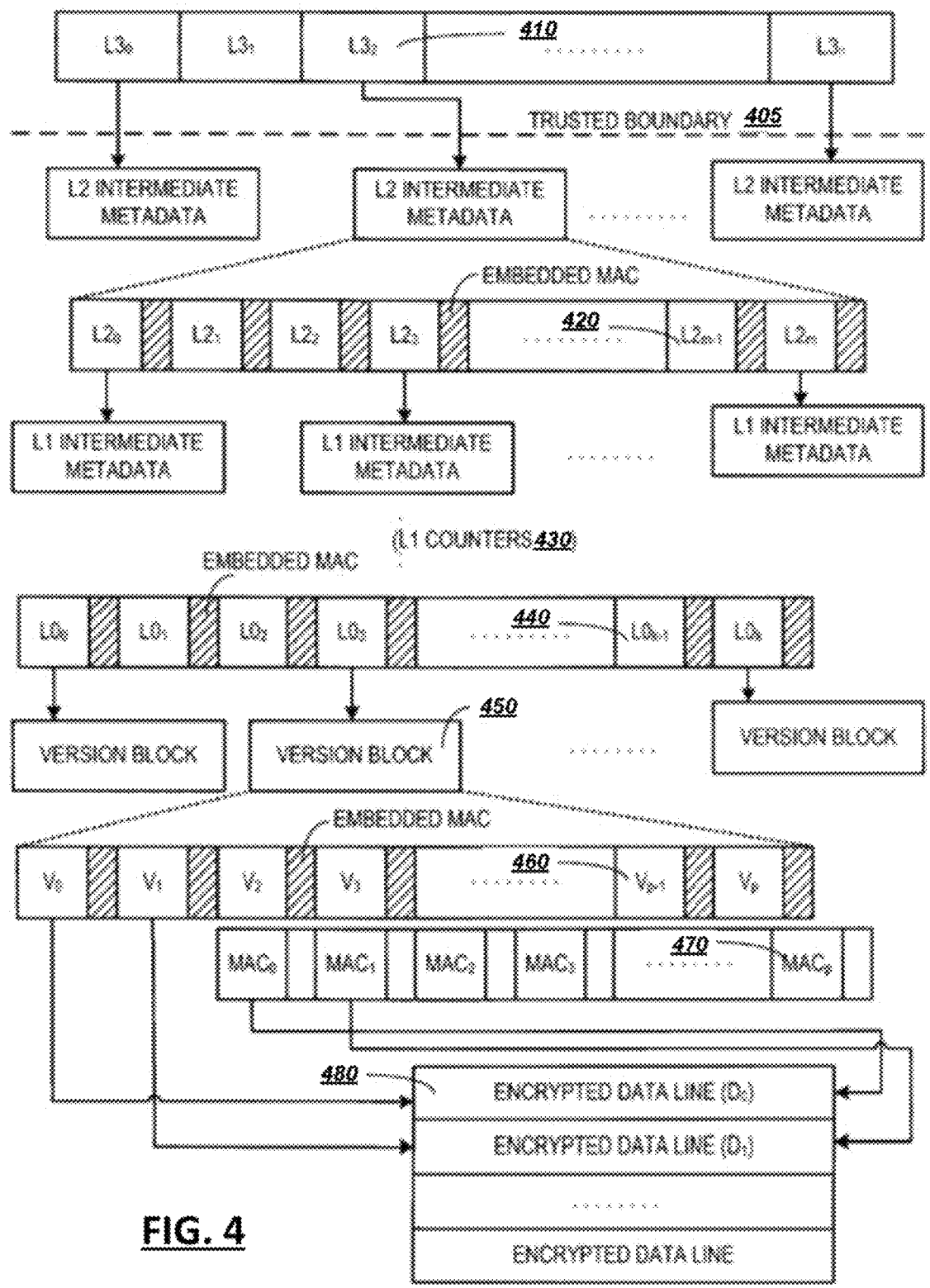
FIG. 4 is a simplified block diagram representing an example replay integrity tree structure in accordance with one embodiment.

An integrity tree may serve as a mechanism for using a small amount of internal storage to protect a larger amount of data. For a memory encryption technology that can use an internal integrity key, embedded MACs may be used in layers of the integrity tree. The integrity may be considered tamper resistant based on at least the root (and, in some cases, only the root) being stored on-die. The pages within the protected memory region are "covered" by the integrity tree to guard against replay. FIG. 4 illustrates an anti-replay counter implemented through an example integrity tree structure for integrity and replay protections according to one embodiment. It should be noted that the counter mode encryption described herein represents but one example; other embodiments can work with alternative mechanisms of counter mode encryption. For instance, in alternative embodiments there may be more or fewer levels in the integrity tree structure than what is shown in FIG. 4, among other variants.

An integrity tree structure includes a hierarchy of levels of tree nodes. The top (root) level includes a sequence of on-die counters (i.e., L3 counters 410), which are stored in the internal storage of the processor die. The internal storage includes, but is not limited to, the on-die Static Random Access Memory (SRAM), register files, and any other suitable memory in the processor die. As the L3 counters 410 are on the processor die, their contents are trusted and secure from passive and active attacks. However, the trusted boundary (shown as a dotted line 405) ends at the L3 counters 410. In one embodiment, the lower levels of the integrity tree lie outside of the processor die (e.g., in the main memory 220 of the example of FIG. 2).

In one embodiment, each L3 counter 410 is linked to a block of L2 intermediate metadata, which contains a sequence of L2 counters 420. Each L2 counter 420 is linked to a block of L1 intermediate metadata, which contains a sequence of L1 counters 430. The blocks representing the L1 intermediate metadata and the L1 counters 430 are omitted from FIG. 4 for simplicity of illustration. Each L1 counter 430 is linked to a block of L0 intermediate metadata, which contains a sequence of L0 counters 440. Each L0 counter 440 is linked to a version block 450, which contains a sequence of version nodes (represented by "V") 460. Each version node 460 is associated with an encrypted data line 480 in the protected region (e.g., 225) of the main memory (e.g., 220). The content of a version node 260 may be the version of the associated data line, which provides a temporal component of the encryption seed in the counter mode encryption. The version is the seed that is to be encrypted to generate a cryptographic pad, which may then be exclusive OR-ed ("XOR-ed") with the cipher/plain text content of the data line generate the plain/cipher text. As the lower-level counters (including L2, L1 and L0 counters and the version nodes 260) are off the processor die and therefore are susceptible to attacks, each counter and each version node are encoded with an embedded Message Authentication Code (MAC) (shown as the blocks with hatched lines) to ensure their integrity.

In one embodiment, each embedded MAC is computed over the line in which they are embedded, using a corresponding counter from the next higher level as input. In the example of FIG. 4, the embedded MAC for the version block 450 associated with L0.sub.3 (shown in FIG. 4 as the middle version block) is computed using the values of $V_o$-$V_p$ and its corresponding L0 counter ($L0_3$). The value of this embedded MAC is stored striped in the line of the version blocks 450 (shown as striped boxes in FIG. 4). The embedded MAC for each line of L0, L1 and L2 is computed similarly. L3 counters do not need embedded MACs because the contents of L3 counters are within the trusted boundary 405.

The entire integrity tree built over the protected memory region, starting from the versions up to the L3 counters, provides replay protection to the data lines in the protected memory region. The process of replay protection is as follows. When a processor performs a read operation or a write operation to a data line, the MEE 250 loads a branch of the integrity tree that contains tree nodes (also referred to as branch nodes) identified by the address of the data line. The process of loading the tree nodes along a branch and verifying the authenticity of their values is herein referred to as a tree walk. Tree walks proceed from the bottom level of the integrity tree (i.e., the version nodes 460) to the root nodes (i.e., the L3 counters). The authenticity of the tree node values needs to be verified because a major portion of the tree structure is resident in the main memory and therefore is susceptible to attacks. In case of a write, the tree walk is performed to verify the authenticity of the branch nodes values and update those values. In case of a read, the tree walk is also performed to verify the authenticity of the branch nodes values but without updating those values. In one embodiment, the MEE 250 contains a finite state machine circuitry that implements the tree walk.

In one embodiment, each encrypted data line 480 is encoded with a MAC node 470 containing a MAC computed from the content of the data line 480. Each time the data line is written back to memory, the MEE 250 (e.g., of FIG. 2) updates this MAC to reflect the most recent data value stored in memory. When a data line is read from memory, the MEE 250 verifies the value of its associated MAC node 470 to establish the integrity of the data line being read. The use of the MAC nodes 470 provides integrity protection against modification attacks on a memory-resident data line.

When the processor executes a write operation to write back one of the encrypted data lines 480 into the protected memory region (e.g., when evicting a data line from an on-die last level cache to the protected region in the main memory), the MEE 250 identifies the version node 460 and the L0, L1, L2 and L3 counters (410-440) associated with that data line. The MEE 250 updates the MAC 470 associated with the data line and increments the version of that data line in the identified version node 460. In addition, the MEE 250 also updates the identified L0, L1, L2 and L3 counters (410-440) of that data line, as well as the embedded MAC associated with the updated version and the counters. This update process proceeds from the bottom level of the integrity tree up to the root level of L3 counters, which are stored securely on the chip on the processor die and hence are guaranteed protection against attacks. The counters at each level of the integrity tree act as the versions for the next lower level ending with the version nodes 460 storing the versions for the data lines. Hence, on a write to a data line, all of counters (including the version) and their associated embedded MACs along the branch identified by the data line's address are updated to reflect the version update.

In order to ensure replay protection, each time a data line is loaded from the protected region it is verified for authenticity against the tree nodes up to the root of the integrity tree. A mismatch at any level indicates a potential attack and raises a security exception, thereby defeating the attack. Specifically, when a processor executes a read operation on one of the encrypted data lines 480, the MEE 250 identifies the version and the L0, L1, L2 and L3 counters (410-440) of that data line. Read operations do not alter the values of the version and the L0, L1, L2 and L3 counters (410-440). Upon a read operation, the MEE 250 verifies the MAC 470 associated with the data line. In addition, the MEE 250 verifies the embedded MAC associated with each of the version, L0, L1, L2 and L3 counters (410-440). This verification process proceeds from the bottom level of the integrity tree up to the secure root counter L3.

In one embodiment, the tree nodes loaded in a tree walk are cached locally in an MEE cache, which is a local cache of the MEE 250. The MEE cache stores the values of the tree nodes (including the version nodes and the embedded MACs) that have been verified by previous requests. The content of the MEE cache is secure because it is located on the processor die. For read operations, a tree walk is terminated when the first node along the branch of the tree walk is found in the MEE cache. For write operations, a tree walk is terminated when the first node along the branch of the tree walk is found in the MEE cache and that the cached tree node is in the modified state.

To ensure that the integrity tree returns correct counter values for all requests, on a write request the MEE 250 completes the update to all of the tree nodes along the write request's branch before any other request (read or write) sharing any of those tree nodes can proceed. As read requests do not alter the values of the integrity tree, some of the read requests may be processed in parallel even though these read requests share one or more of the tree nodes in the integrity tree.

In accordance with the above, some embodiments enable parallelized tree walk that allows multiple read requests to proceed in parallel. The parallelized tree walk reduces the overhead for integrity and replay protections. The parallelized tree walk is based on the observation that read requests need not be serialized, as read does not modify any counter value in the integrity tree. However, write operations update the counter values in the integrity tree so proper ordering needs to be maintained. Dependency needs to be enforced for requests that involve a write to ensure that the correct counter values are used to perform authenticity checks. In one embodiment, the MEE 250 performs a dependency check upon receiving an incoming read request to determine whether the incoming read request shares any of the tree nodes with a previously received read request that is being processed by the MEE 250, and whether parallelized tree walks can be performed in the presence of the sharing of the tree nodes.

In some implementations, the protection and encryption of each line (or "cache line") of protected memory may be enabled through supporting data, or "metadata", including the integrity tree (and the embedded MACs of the integrity tree layers), a version value, and a MAC value for the line. This metadata, or "security metadata" as referred to herein, may impose significant storage overheads, in some cases representing a 25% storage overhead, which may discourage the use of this technology in some applications. This overhead, in traditional implementations, may be static, such that memory is preallocated, or is "stolen", to hold security metadata irrespective of whether corresponding lines or pages of protected memory are actually allocated and used by enclaves within a system, among other example issues.

In some implementations, indirection directories may be provided to reduce security metadata overheads by up to 94%. For instance, in a traditional implementation imposing a 25% storage overhead to support corresponding security metadata, the use of an indirection directory may allow only 1.5% of memory to be reserved. Further, an indirection directory implementation may additionally afford for the dynamic allocation of additional protected memory and corresponding security metadata (e.g., depending on the memory used by enclaves on the platform). Further, indirection directories may be combined with other security metadata overhead optimization solutions to yield even further benefits, such as major/minor counters (such as described in the U.S. Pat. No. 9,798,900, incorporated by reference herein) and crypto cache lines (such as described in the U.S. patent application Ser. No. 14/863,353, incorporated by reference herein), among other example solutions.

Figure 5:
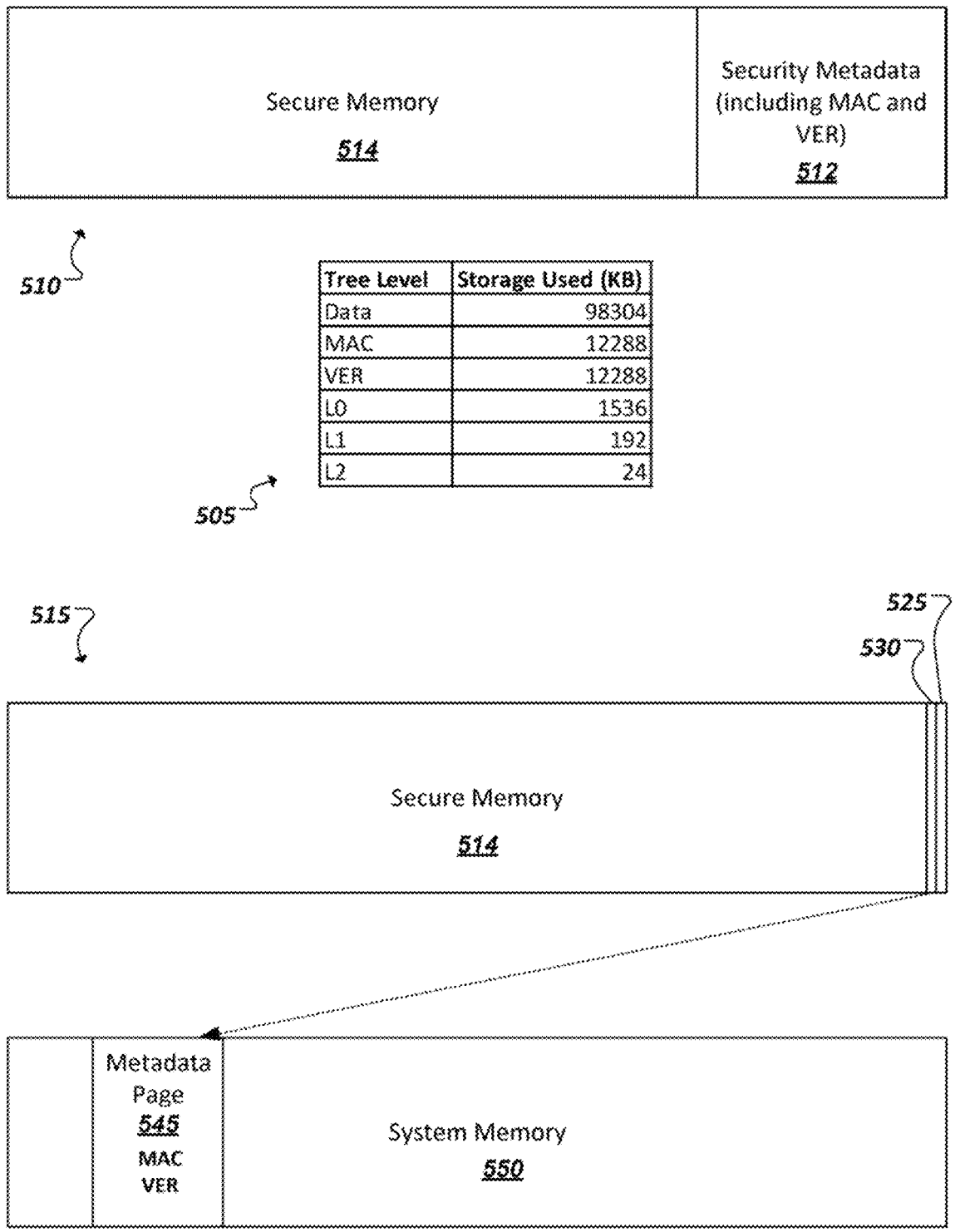
FIG. 5 are simplified diagrams representing allocation of security metadata in memory in accordance with one embodiment.

Turning to FIG. 5, an example is illustrated of the cache line sizes and corresponding amounts of security metadata provided to implement a counter mode encryption scheme to protect memory of an example system. For instance, table 505 shows that to protect roughly 96 MB of data, a total of approximately 26 MB of security metadata is to be used. Nearly 24 MB of this security metadata is provided through the MAC and Version values to be provided for corresponding pages of data. Accordingly, to pre-allocate this block of protected data in one example (illustrated by diagram 510), nearly 25% of the entire allocated data 514 is reserved for storage of the security metadata 512. Through the use of an indirection directory, however, the indirection directory stores pointers (e.g., for page of protected memory) to point to a portion of security metadata, which may be allocated dynamically (and outside the region of data reserved for protected data). In one example, the metadata for lower levels in the tree (e.g., the MAC and Version layers) for a memory page may be allocated dynamically in memory and pointed to by corresponding indirection directory pointers. Accordingly, the metadata for lower levels in the tree (which takes up the majority of the security metadata storage overhead used to implement a corresponding counter mode encryption scheme) may be instead allocated dynamically. Additionally, page conversion instructions may be further introduced to provide the flexible addition (e.g., conversion) of pages to protected memory by allowing for corresponding security metadata to be flexibly added (and pointed to using the indirection directory), among other example benefits. For instance, diagram 515 illustrates the savings in overhead over the example in diagram 510, with only the lower levels of the integrity tree and the indirection directory being pre-allocated for a block of protected memory, thereby realizing a minimal storage overhead of approximately 1.5%. Further, implementations of an indirection directory may impose minimal additional perform overheads, which are only limited to those applications and processes making use of corresponding pages of protected memory.

In the example of FIG. 5, the diagram 515 illustrates an implementation where the counter tree (other than the top-level counters) is stored in memory. In an example with a 56$b$ MAC and a 56$b$ version value, eight MACs and eight version values can each be stored in a single cache line. An indirection directory (e.g., 530) may be provided based on the observation that majority of storage overhead in the MEE replay tree are due to the lower level nodes (i.e., the MAC and version values). Further, in this particular example, L3 is the top-level in the replay tree and stored in on-die memory. The intermediate levels of the replay integrity tree, L0-L2, require only 1.3% of the overall protected memory (128 MB in this example). With indirection directories, for an N-level tree, tree levels L0 to LN-1 are stored in stolen memory. The lower levels of metadata (MAC and version) may be dynamically allocated, for instance, when a page of memory designated for protection, such as when it is converted to be used with an enclave.

The MEE hardware computes the addresses of all tree nodes for a particular access on admittance of the memory request to the MEE engine. With a traditional MEE design (represented by diagram 510), because the entire storage for the replay tree (i.e., the entire security metadata) is reserved in memory, there is a 1:1 fixed mapping of the replay tree nodes from the request address. With an MEE utilizing an indirection directory, because the allocation of the lower level in the trees is dynamic, the MEE hardware cannot directly compute the tree node addresses to start the tree walk from the data line address itself. In order to allow MEE to fetch the tree nodes, the MEE may access the indirection directory to obtain any security metadata not already allocated in memory. An indirection directory stores pointers to pages where the lower nodes in the tree for a physical page are stored. Each page in physical memory has a unique entry in the indirection directory to allow system software to store a pointer to the lower level security metadata for any physical page. As shown in diagram 515, the indirection directory 530 is also pre-allocated in fixed/stolen storage. For instance, in an example implementation using a 64$b$ physical address pointer for each page, the indirection directory would results in an additional 0.2% of storage overhead. The indirection directory combined with the storage for higher levels in the tree results in a total fixed storage overheads of 1.5% for indirection trees.

As noted above, an example MEE may embody two primary cryptographic mechanisms, memory encryption and integrity/replay protection designed to defend against passive and active attacks respectively. Memory encryption is primarily designed to protect against a class of hardware attacks where the attacker tries to silently observe the data lines as they move on and off the processor chip (passive attacks). In order to defend against these attacks, an MEE may employ encryption to the MEE region. In essence, when a data line moves to memory it is encrypted by the MEE on-chip before getting stored in the main memory. On a memory read to the protected region, the data line is first decrypted by MEE before being fed to the processor. Encryption and decryption may utilize counter mode encryption. This can allow the cryptographic work required to encrypt/decrypt a data line to be decoupled from the data itself. This may be done by encrypting a seed (or "version" node) (independent of the data) which is uniquely associated with a respective data line. Each data line to be encrypted may have an associated version seed. The seed is encrypted (to create a "pad") to be used to encrypt/decrypt the data line by XORing the cryptographic pad with the data line.

Returning to the discussion of the example of FIG. 4, an integrity tree provides a high-level counter tree organization used to protect the integrity and ensure replay protection of the data lines in the memory range protected by an MEE. As discussed above, the counter tree consists of MAC nodes, version nodes, and metadata nodes, and the top-level (or L3) counters. For each data line in the MEE region, a per data line MAC value is associated. Each time the data line is written back to memory, this MAC is updated to reflect the most recent data that is stored in memory. When a data line is read from memory, the MEE verifies its MAC as well. This ensures protection against modification attacks on the data line while it was resident in memory, providing integrity protection to the MEE region. The version nodes hold the version of a data line which is incremented each time a data line is written back to memory. A metadata node in the counter tree (L0, L1, L2) consists of counter values and an embedded MAC, computed over the counters stored in the node. As an input to the embedded MAC, a counter from the next higher level in the tree is used. This process continues up to the root counters or top-level counter (L3), which are stored securely on the chip in SRAM. In some implementations, these L3 counters are never evicted off the processor chip and hence are guaranteed protection against attacks. In essence, the counters at each level in the tree act as versions for the next lower level ending with the version nodes storing the versions for the data lines. Hence, on a write to a data line, all counters (including the version) and associated embedded MACs along the data line's branches must be updated to ensure that the counters along the tree branch now reflect this update. In order to ensure replay-protection, each time a data line is loaded from the protected region, it is verified for authenticity against the tree nodes up to the root. A mismatch at any level indicates a potential attack and raises a security exception, thereby defeating the attack.

The process of loading the tree nodes along a branch and verifying their authenticity embodies a "tree walk". For instance, in the case of a write, the tree walk is done to load the tree nodes that need to be updated and verify their authenticity as they were resident in the main memory. In the case of a read, the tree walk also establishes the integrity of the data line read. MEE contains logic (e.g., as implemented through an execution unit and corresponding instruction), which implements the tree walk. In some cases, at least some of the tree nodes loaded in a tree walk may be cached locally in an MEE specific cache. With the MEE cache, a tree walk may be terminated when the first node along the tree walk is found in the cache (for writes, the cached tree node should be in modified state for the walk to be terminated). This is the case as a node in the MEE cache is considered to be secure, as it was verified by a previous request before being cached, and serves the same purpose as the L3 node on the processor chip.

As noted above, an MEE-based architecture may be enhanced through the provision of an indirection directory to allow at least some of the security metadata used by the MEE to be allocated on the fly (and potentially anywhere in memory), rather than pre-allocating most or all of the security metadata together with the reservation of memory for a protected region. In one example, the only security metadata that is to be pre-allocated are the layers 525 of the integrity tree above the MAC and version nodes and below the top layer(s) (e.g., L3) stored in on-die memory. The indirection directory 530 may also be pre-allocated, as shown in FIG. 5. All other security metadata (e.g., the MACs and versions of secured pages) may be dynamically allocated in other memory regions (e.g., 550). For instance, upon identifying data to be protected in a particular page designated for secure memory, a separate security metadata page 545 may be identified or created and pointed to by the indirection directory 530. The MAC and version values for the protected page may be calculated and loaded into the security metadata page 545. The MEE may consult the indirection directory to identify a pointer corresponding to the particular page that points to the security metadata page 545, which the MEE may use to access the MAC and version for the page, complete an associated tree walk, and perform encryption/decryption of the data of the particular page.

Figure 6:
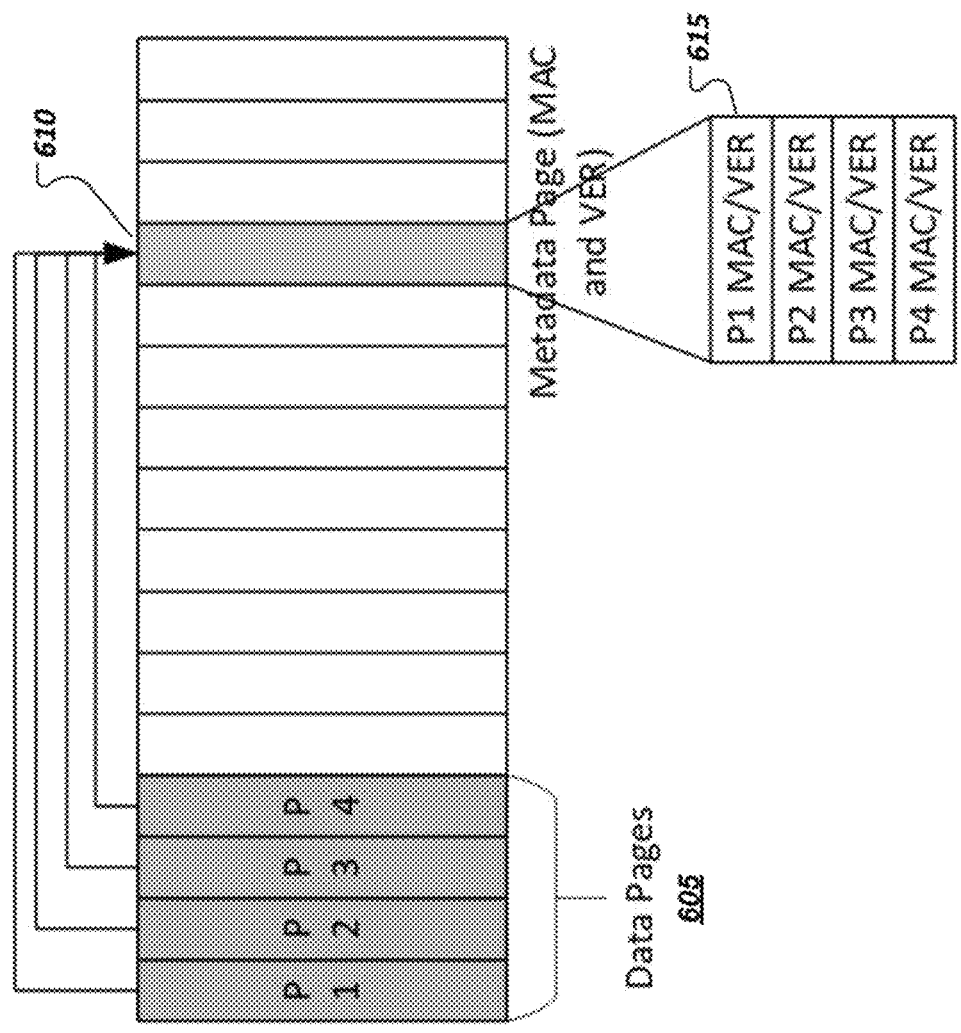
FIG. 6 is a simplified block diagram representing use of an example indirection directory in accordance with one embodiment.

Turning to the simplified block diagram of FIG. 6, example address mappings are shown to illustrate pointers of an example indirection directory. As noted above, with indirection directories, the upper levels in an integrity tree may continue to be stored in stolen memory and hence the mappings to those levels can be computed directly by the MEE from the request address of the protected page. The MAC and version (VER) levels, on the other hand, are not fixed or reserved in memory, and are instead allocated dynamically. Moreover, MAC and VER data can be potentially located anywhere in memory. Flexible EPC architecture introduces two instructions, EMKEPC and EMKNONEPC to convert a regular page to secure and vice-versa respectively. Indirection trees extends these instructions When a new page of memory is designated as secure (e.g., by adding the page to protected memory or converting an existing, regular page to protected memory, etc.) additional memory is allocated for the storage of the MAC and VER of that page. Further, the location of this additional memory allocated for the MAC and VER may be documented in a pointer within the indirection directory 530. MEE hardware may then utilize the indirection directory to fetch and update the MAC and VER data for any corresponding, protected page. In some implementations, a security metadata page may be created to contain MAC and VER data for one or more protected pages. The indirection directory may point to such security metadata pages to allow an MEE to extract MAC and VER access from the security metadata page.

In one example, a MAC and VER line can store metadata for 8 data lines each. Hence for a single page (e.g., 64 data lines), 8 cache lines for MAC and 8 cache lines for VER are needed allowing a single memory page to store lower level metadata (MAC and VER) for 4 pages of protected memory. Accordingly, in such an example, a single security metadata page may be used to store the MAC and VER information for a block of 4 protected memory pages. In such implementations, when a new security metadata page is allocated, it may be additionally used to store MAC and VER information for up to three subsequently allocated protected pages. Accordingly, system software, along with tracking other attributes of a physical page, may track whether metadata for a particular page in memory is already allocated and in use. In the above example, this can be done at the granularity of 4 memory pages. The whole memory can be viewed, in this example, as contiguous groups (e.g., 605) of 4 memory pages and for each group, a single metadata page 610 (storing MAC and VER lines (e.g., 615)) is provided, such as illustrated in FIG. 6. If for a group, a metadata page has been allocated for any of the member pages, a new metadata page is not allocated when a different member page is converted to secure. In some instances, within each metadata page (e.g., 610), the mappings within the corresponding group 605 of four memory pages are fixed. In some instances, during the lifetime of the system, system software may not find enough contiguous pages for allocation as a group (e.g., of four contiguous pages), resulting in some entries in the corresponding security metadata page being unused (e.g., to reflect a grouping of less than four pages). Such situations may be acceptable as, on balance, high utilization of the dynamically allocated security metadata pages is attainable.

It should be appreciated that the example of FIG. 6 is provided for illustrative purposes only and that other examples may utilize pointer values, cache lines, memory pages, MAC and VER values, etc. of different sizes than illustrated in the particular example of FIG. 6. Further, it should be appreciated that a single security metadata page may be provided to store security metadata for multiple protected pages (i.e., with the grouping of protected pages being potentially less than or more than the four illustrated in the example of FIG. 6). As other variants, different security metadata may be included in security metadata pages than set forth in the prior example, such as in implementations using a different version of an integrity tree, among other alternative features and implementations.

Figure 7:
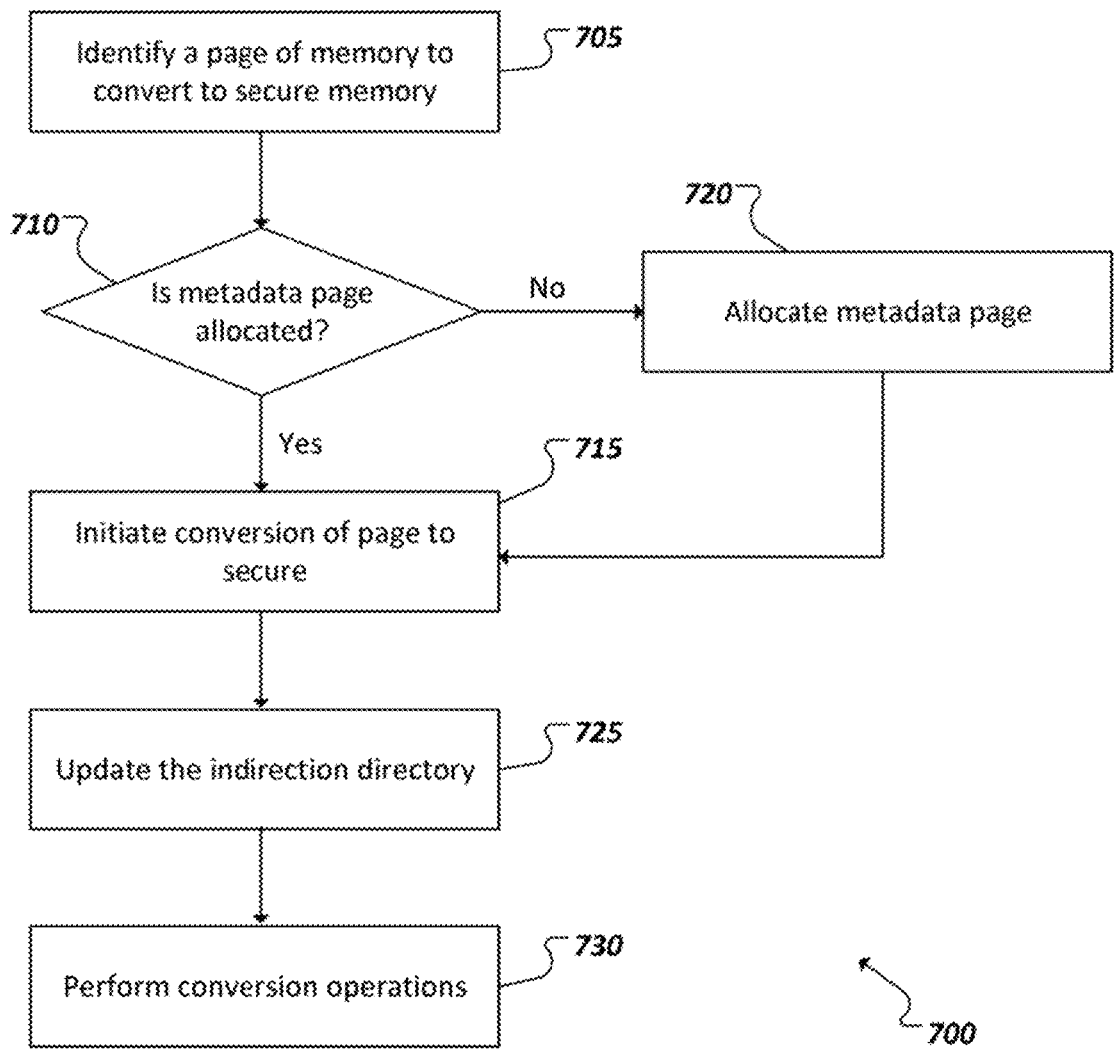
FIG. 7 is a simplified flow diagram illustrating an example technique for securing of a page of memory in accordance with one embodiment.

Turning to the flowchart 700 of FIG. 7, an example technique is illustrated for adding a new page to protected memory. In this example, system software identifies 705 a page of memory to convert to secure (protected) memory. In this example, security metadata pages may be provided, which may store security metadata for a contiguous block of multiple pages of memory (such as in the example of FIG. 6). Upon allocating a page of memory to secure, the corresponding security metadata page is to be mapped to the physical page through the indirection directory. For instance, a fixed 64b slot may be provided in the indirection directory for each physical page in memory. This slot is used for the address of the security metadata page for the physical page which will then be used by the MEE in its tree walk. For instance, when the system software has a page to convert to secure, it may first check (at 710) to see (using internal tracking information) if a security metadata page has already been allocated for carrying the lower level metadata (MAC and VER) for the page being converted (e.g., because another memory page in a group of memory pages covered by the metadata page has already been allocated). If the security metadata page has already been allocated, system software may proceed to convert 715 the page to secure. If not, the system software allocates 720 a page of memory to serve as the security metadata page for storing at least some of the security metadata (e.g., MAC and VER values) for the page to be converted to secure.

In some implementations, converting 715 a page to secure can involve calling a specific instruction to be executed using microcode of the processor. The instruction may take, as inputs, the address of the particular physical page being updated to secure and the address of the security metadata page to be used to store security metadata (e.g., MAC and VER values) in association with securing the particular physical page. Upon execution of the instruction, the core microcode can update 725 the indirection directory entry corresponding to the physical page converted to carry the address of the metadata page. In this example, the indirection directory memory is stolen and cannot be accessed by software directly. Conversion 715 of the page to secure can further cause additional conversion operations to be performed 730, such as flushing MEE internal cache, resetting version counters, etc. With the page converted to secure, the page may be available for use by an enclave with the address mappings fully installed.

Figure 8:
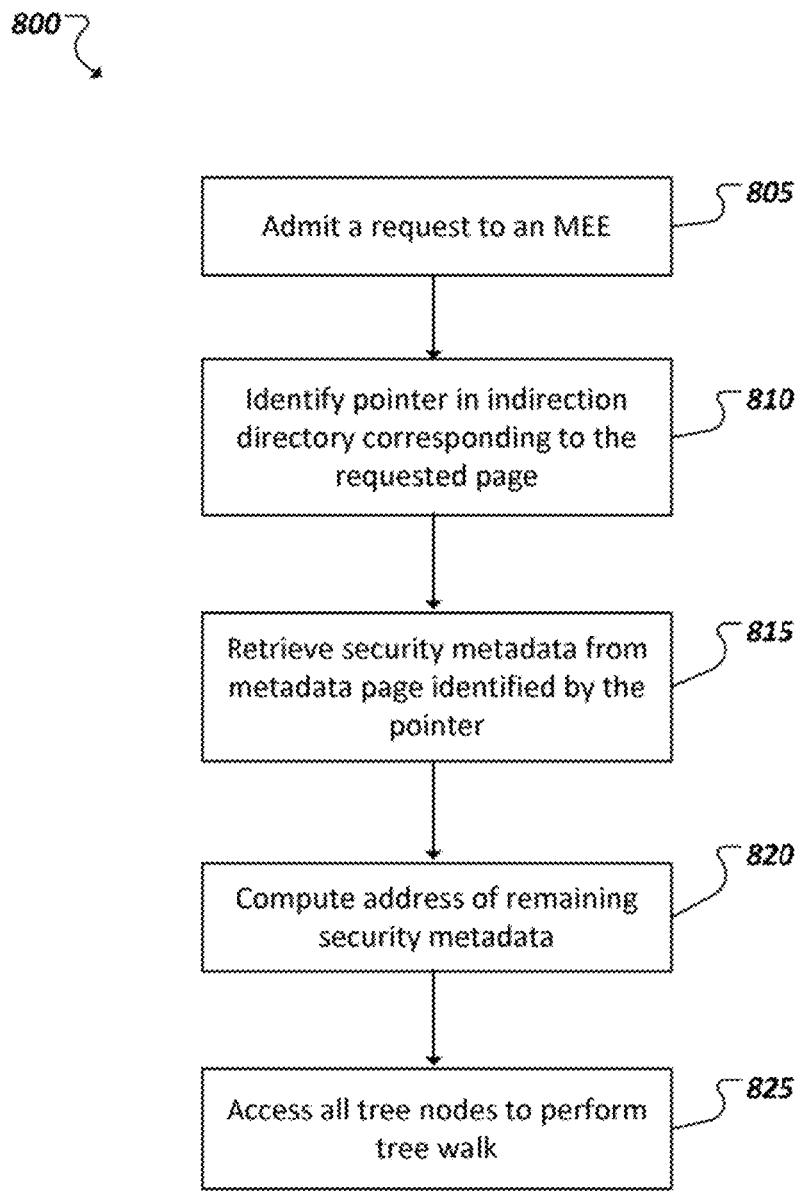
FIG. 8 is a simplified flow diagram illustrating an example technique for allocating a metadata page corresponding to a secured page of memory in accordance with one embodiment.

Turning to the flowchart 800 of FIG. 8, with a page converted or otherwise added to secure memory (such as described in the example of FIG. 7), an MEE may be utilized to manage the encryption, decryption, and verification of data to be included in the page. For instance, as introduced above, when processing a request involving a line of data from a protected memory page, the MEE may perform a tree walk of an integrity tree to validate security of the data. For instance, on admitting 805 a request, the MEE hardware may compute 810 the address of the indirection directory for the physical page on which the request resides. Using the indirection directory value (a pointer to the corresponding security metadata page), the MEE may retrieve 815 metadata (e.g., the MAC and VER) for the request that is not in fixed, stolen memory. For instance, the MEE may identify the address of the security metadata page from the indirection directory and extract the MAC and VER lines for the memory access. The MEE may use the request address to compute 820 the addresses of remaining security metadata stored in stolen memory (e.g., at least some of the higher levels in the integrity counter tree) to access 825 all tree nodes needed to complete a tree walk in connection with the request (in 805).

In implementations using indirection directories, such as described above the system software can use the security metadata pages referenced by the indirection directory as a regular page or even convert it to a secure page once all the memory pages that are using the metadata page have been converted to regular. Any incorrect operation by system software may be caught by MEE hardware as an integrity failure and hence no special operations may need to be added (e.g., a conversion instruction from secure to regular) and no special protection hardware provided to protect the integrity of security metadata pages. While introducing an indirection direction may extend a tree walk by on level (in the worst case), the savings realized in storage overhead of related security metadata is significant. In some cases, the modest penalty resulting from accessing an indirection directory can be minimized by caching the indirection directory in the MEE cache and with spatial locality in the application, majority of accesses should find the indirection directory value in the cache, avoiding the additional access to memory, among other example enhancements.

Figure 9:
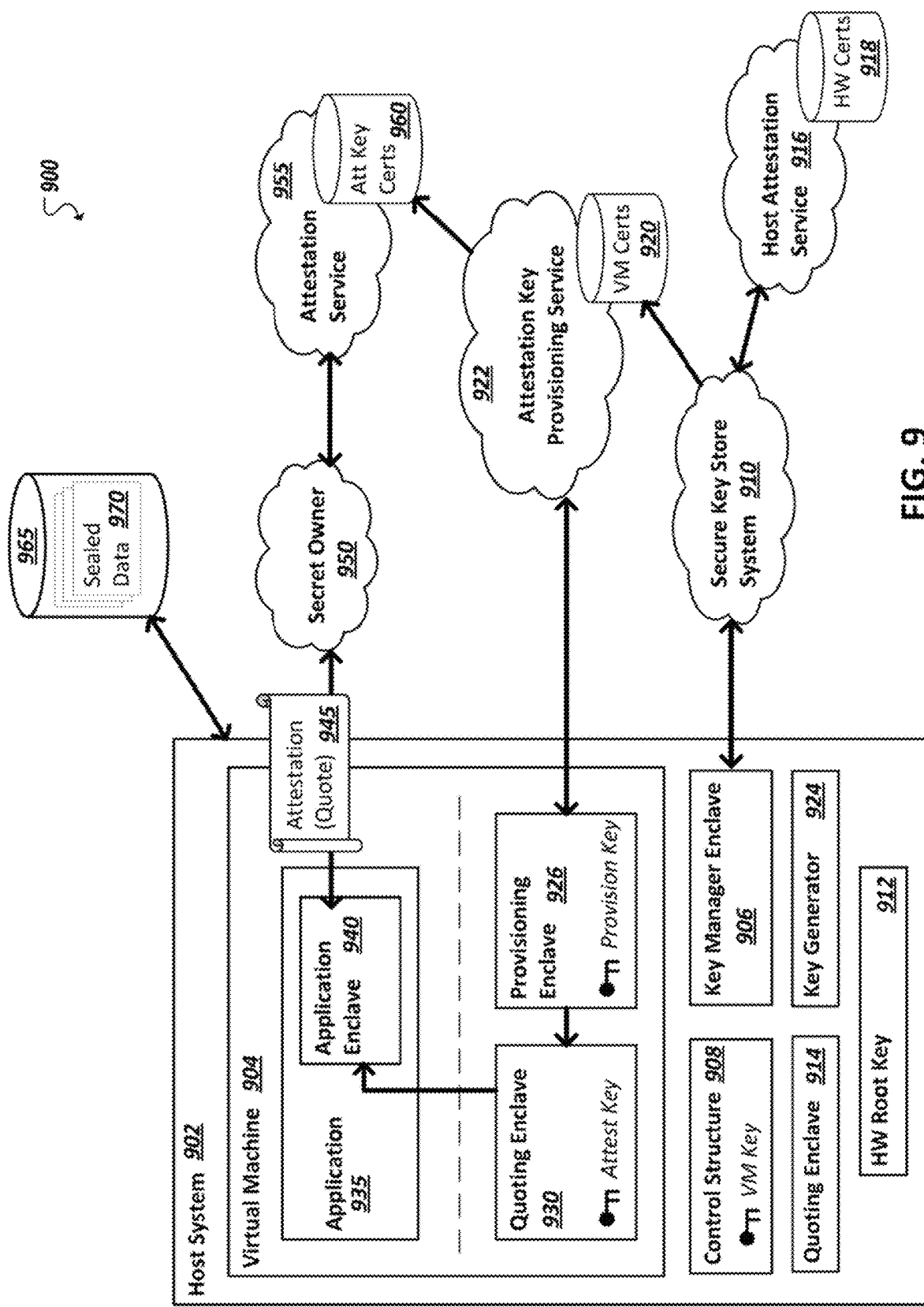
FIG. 9 is a simplified block diagram representing provisioning of keys in using secure enclaves in accordance with one embodiment.

As noted above, protected memory regions may be allocated for use by secure enclaves governed using MEE hardware. A variety of application may be developed, which utilize secure enclaves, which may rely on memory protection, such as set forth above. As an example, FIG. 9 is a simplified block diagram 900 illustrating the use of secure enclaves to perform example attestations and key provisioning to deploy a secured virtual machine 904 on a particular host system 902. In this example, the host system 902 hosts a key manager enclave 906 and a secure control structure 908. The key manager enclave may provision the control structure 908 with a VM root key to be stored in secure memory of the host system 902. The key manager enclave 906 may perform an attestation of its trustworthiness to the key store system 910 in order to establish that a VM key it seeks to register for a VM (e.g., 904) is authentic or that a key store system 910 may entrust the key manager enclave 906 with pre-existing keys from the key store 910. As the key manager enclave is hosted directly on the host system 902, the key manager enclave may utilize a quote based on a hardware-based root key 912 of its respective host system 902. Indeed, the host system 902 may include a quoting enclave 914, which may have access to the host root key 912 (or another key derived from the host root key 912) to sign a quote for the key manager enclave 906 in connection with attestation of the key manager enclave 904 with the key store system 910. The key store system 910, to validate a quote received from the key manager enclave 904 may identify a host attestation service 916 that hosts certificates 918 based on and corresponding to various host platform root keys (e.g., 912) (which may have been generated during manufacture of the host platform during setting of the corresponding root key). The host attestation service 916 may validate that the signature was generated by a valid root key of a trusted hardware platform (e.g., 902) and return this result to the key store system 910 to allow the key store system 910 to conclude that the key manager enclave 904 is secure and trustworthy. The key store system 910, in some implementations, may also generate certificates 920 corresponding to VM keys maintained at the key store 910 that have been associated and bound to particular virtual machine instances. These certificates 920 may be provided to various attestation and provisioning services (e.g., 922), which may be utilized to validate subsequent attestations based on signatures signed by the VM root keys (or keys derived from the VM root keys).

With a root key assigned to a VM (e.g., 904) and stored securely in a control structure 908 (implemented in secure memory), a secure VM instance may be fully instantiated on the host system 902. Indeed, as part of the launching a VM instance (e.g., 904) on a host system 902, the key manager enclave 906 may build an associated control structure (e.g., 908) for the VM 904 (which is to only be accessible to the key manager enclave 906 (and certain processor-based instruction set functions (e.g., key generator logic 924)) and load a corresponding VM root key (and potentially other keys) in the data control structure 908. Other keys may be derived for the VM 904 based on the VM root key provisioned in the data control structure 908 (i.e., rather than the hardware root key 912). Indeed, key generation logic 924 may identify when a data control structure (e.g., 908) is associated with a particular VM instance (e.g., 904), for instance, based on the data control structure being associated with the CPU or CPU thread set to run the VM instance. As a result, the key generation logic 924 may determine that a VM root key stored in the data control structure 908 is to be used in lieu of the (e.g., default) host root key 912, among other examples.

In some implementations, the key generation logic 924 may be configured to derive, from either a host root key (e.g., 912) or a VM root key (stored in a data control structure associated with a corresponding VM instance (e.g., 904)) keys for use with an application or VM instance, including sealing keys and a VM provisioning key. In the case of a provisioning key, as shown in the example of FIG. 9, a provisioning key may be derived from a VM root key in data control structure 908 and secured within a provisioning enclave 926 hosted in the corresponding VM instance 904. A provisioning key may be used by the provisioning enclave 926 to authenticate the provisioning enclave 926 to an attestation key provisioning service 922. The attestation key provisioning service 922 can maintain certificates 920 (including certificates for VM root keys maintained at the key store system 910 and passed to the provisioning service 922 from the key store system 910) that map virtual machines (e.g., 904) and/or devices (e.g., by serial number or other identifier) to corresponding certificates, each certificate generated based on root keys set (and kept in secret) in connection with the VM or device platform. In this manner, certificates can be provided, which do not disclose the secret, but allow the presence of the secret to be verified by the certificate holder (e.g., based on a signature generated from the secret or a key based on the secret). Accordingly, the provisioning enclave 926 can provide signed data to the attestation key provisioning service 922 to attest to its authenticity and that it is implemented on a virtual machine (e.g., 910) registered with the registration service and known to possess functionality enabling the instantiation and hosting of a secure, trustworthy enclave (e.g., 926). Based on this attestation, the attestation key provisioning service 922 can negotiate a secure channel between the attestation key provisioning service 922 and the provisioning enclave 926 and provide an attestation key to the provisioning enclave suite in response. Indeed, the data signed by the provisioning enclave 926 can include information (e.g., signed public keys, protocol identifiers, etc.) used to establish the secure channel. The provisioning enclave 926 of the VM 904 can then provision the VM's quoting enclave 930 with the received attestation key, as shown in the example of FIG. 9.

The quoting enclave 930 can measure or identify attributes of one or more applications (e.g., 935) and/or application enclaves (e.g., 940), as well as the virtual machine 904 and/or hosting platform 902 and can provide this information in a quote containing data, at least a portion of which is signed using the attestation key at the quoting enclave 930. The quoting enclave then passes the signed quote 945 to the application enclave 940, which can communicate the quote to a backend service (such as through a secret owner 950 (e.g., hosting secrets usable by the application to decrypt data or access content, etc.) to attest the authenticity of the application 935. In this example, the backend service 950 (e.g., "secret owner") can utilize the services of an attestation service 955, which can receive attestation key certificates 960 and revocation lists generated by the attestation key provisioning service 922 that generated the attestation key used by the quoting enclave 930 of the virtual machine 904. Through these certificates 960, the attestation service 955 can verify the authenticity of the quote based on the signature included in the quote (signed by the attestation key provided by the attestation key provisioning service 922). Upon verifying the authenticity of the quote and further verifying, from the description of the application enclave 940 included in the quote, the characteristics of the application enclave 940 (e.g., that it is a reliably implemented enclave on a capable, secure platform), the attestation service 955 can communicate the results of the attestation to the backend service 950. From these results, the backend service 950 can provide a level of service (or grant/deny service entirely), allow the application 935 (through the application enclave 940) access to particular data owned by the secret owner, establish protected communication channels between the secret owner's system and the application enclave 940, issuance of certificates from a certificate authority, allow sensor-type platforms to pair with a coordination point and/or allow data to be accepted from sensors (e.g., in an Internet of Things system), among potentially limitless other examples, based on whether or not the application is protected by a trustworthy application enclave.

As noted above, a VM root key may also be utilized by key generation logic 924 to derive one or more sealing keys for the VM 904 and/or its component secure enclaves (e.g., 940, 926, 930). For instance, a secure enclave (e.g., 940, 926, 930) of the VM 904 may request key generation logic 924 to derive a sealing key for the enclave. For example, application enclave 940 may obtain a sealing key generated from the VM root key for use in sealing user data, keys received from a backend service (e.g., 950), among other examples. Sensitive data may be sealed by a VM-root-key-derived sealing key as the sensitive data is received. In other cases, the sensitive data may be sealed by the sealing key prior to a scale-down or other event resulting in the tear down of the VM 904. Data may be sealed within an image of the VM instance (e.g., 904) itself, in some instances. In other cases, the data may be sealed and written (in its encrypted form) in remote storage (e.g., 965), allowing the sensitive data to be accessed by the re-instantiated VM regardless of the platform on which it is hosted. In some cases, keys of other enclaves of the VM (e.g., the provisioning key and attestation key) may be sealed in the sealed data (e.g., 970). In some examples, the entire image of scaled-down VM instance may be sealed by the sealing key, among other examples.

It should be appreciated that the example illustrated in FIG. 9 is presented as but a single example implementation leveraging capabilities of secured memory regions managed by example MEE hardware. A variety of other implementations may realized using similar technology. For instance, Intel™ Software Guard Extension (SGX)-based solutions may make use of MEE and MEE-based encryption and security utilizing the features and schemes discussed herein, among other example platforms and solutions.

Figure 11:
FIG. 11 is a block diagram of an exemplary mobile device system in accordance with one embodiment.
Figure 10:
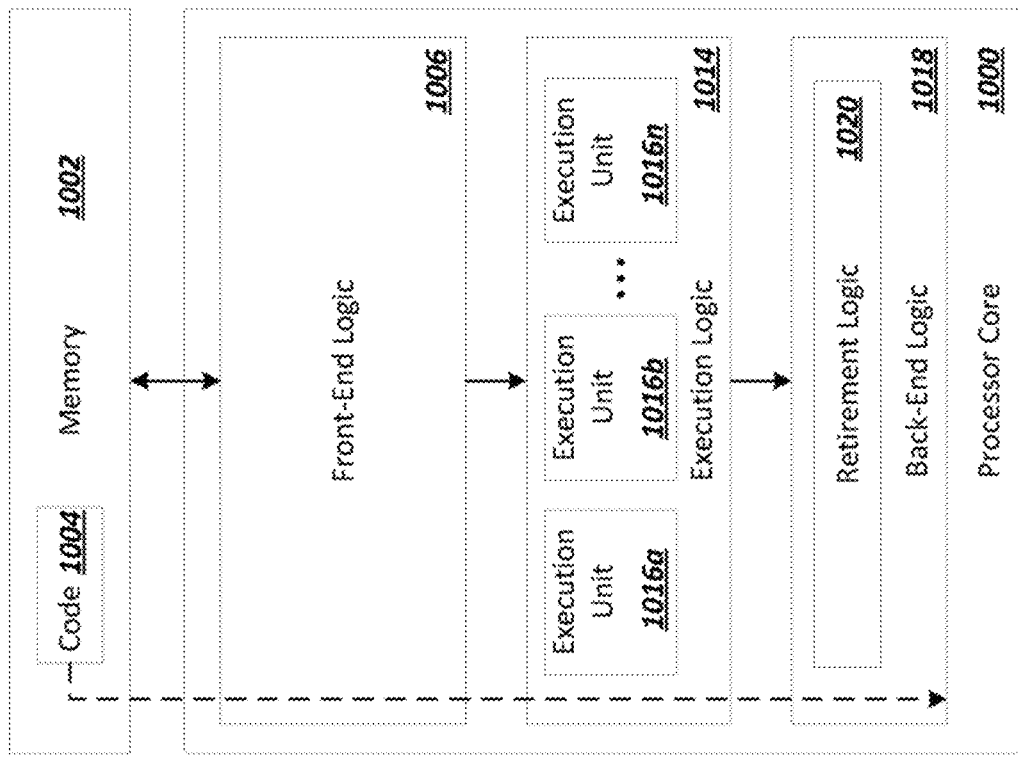
FIG. 10 is a block is a block diagram of an exemplary processor in accordance with one embodiment.
Figure 12:
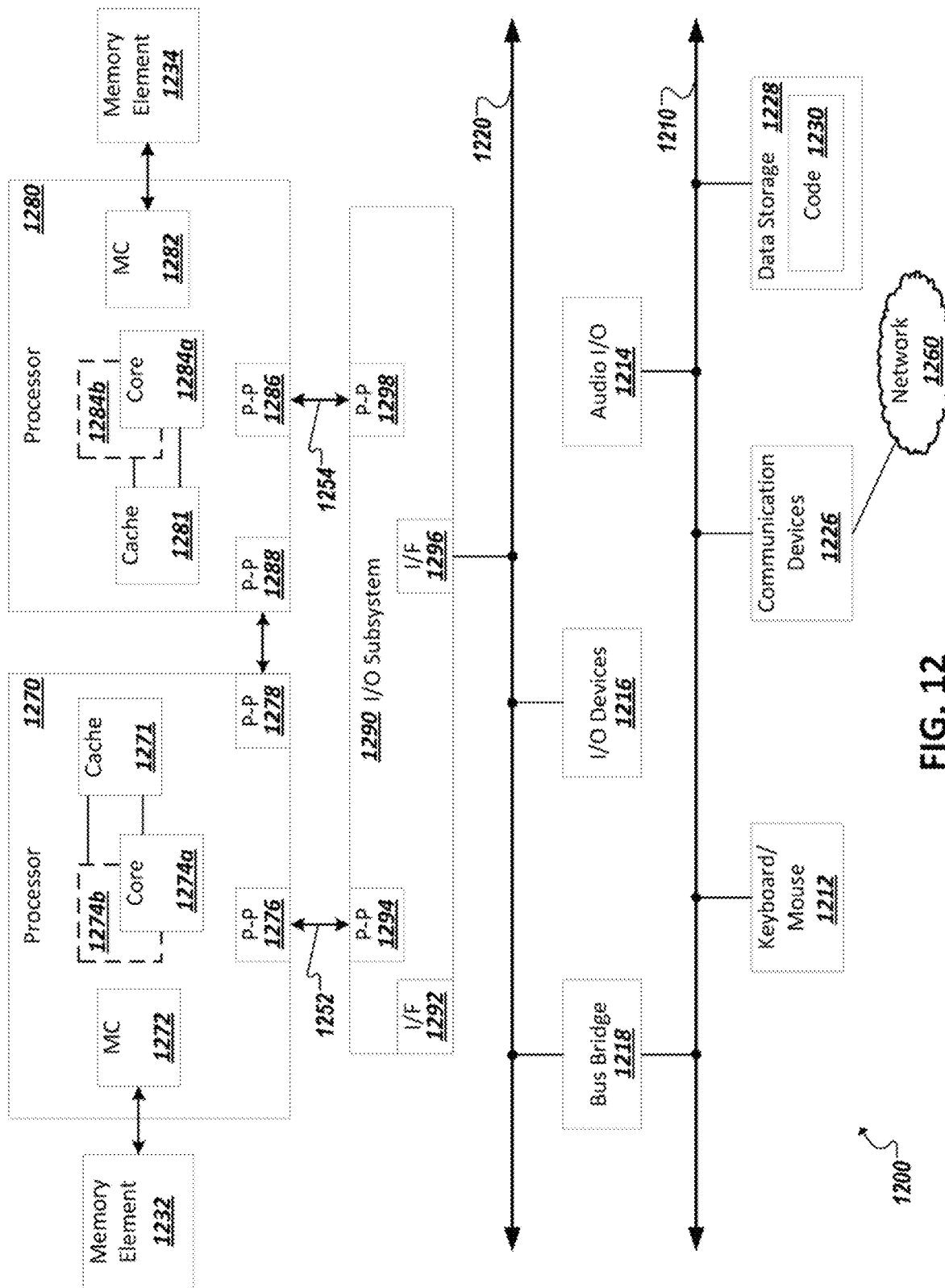
FIG. 12 is a block diagram of an exemplary computing system in accordance with one embodiment.

FIGS. 10-12 are block diagrams of exemplary computer architectures that may be used in accordance with embodiments disclosed herein. Other computer architecture designs known in the art for processors, mobile devices, and computing systems may also be used. Generally, suitable computer architectures for embodiments disclosed herein can include, but are not limited to, configurations illustrated in FIGS. 10-12.

FIG. 10 is an example illustration of a processor according to an embodiment. Processor 1000 is an example of a type of hardware device that can be used in connection with the implementations above.

Processor 1000 may be any type of processor, such as a microprocessor, an embedded processor, a digital signal processor (DSP), a network processor, a multi-core processor, a single core processor, or other device to execute code. Although only one processor 1000 is illustrated in FIG. 10, a processing element may alternatively include more than one of processor 1000 illustrated in FIG. 10. Processor 1000 may be a single-threaded core or, for at least one embodiment, the processor 1000 may be multi-threaded in that it may include more than one hardware thread context (or "logical processor") per core.

FIG. 10 also illustrates a memory 1002 coupled to processor 1000 in accordance with an embodiment. Memory 1002 may be any of a wide variety of memories (including various layers of memory hierarchy) as are known or otherwise available to those of skill in the art. Such memory elements can include, but are not limited to, random access memory (RAM), read only memory (ROM), logic blocks of a field programmable gate array (FPGA), erasable programmable read only memory (EPROM), and electrically erasable programmable ROM (EEPROM).

Processor 1000 can execute any type of instructions associated with algorithms, processes, or operations detailed herein. Generally, processor 1000 can transform an element or an article (e.g., data) from one state or thing to another state or thing.

Code 1004, which may be one or more instructions to be executed by processor 1000, may be stored in memory 1002, or may be stored in software, hardware, firmware, or any suitable combination thereof, or in any other internal or external component, device, element, or object where appropriate and based on particular needs. In one example, processor 1000 can follow a program sequence of instructions indicated by code 1004. Each instruction enters a front-end logic 1006 and is processed by one or more decoders 1008. The decoder may generate, as its output, a micro operation such as a fixed width micro operation in a predefined format, or may generate other instructions, microinstructions, or control signals that reflect the original code instruction. Front-end logic 1006 also includes register renaming logic 1010 and scheduling logic 1012, which generally allocate resources and queue the operation corresponding to the instruction for execution.

Processor 1000 can also include execution logic 1014 having a set of execution units 1016*a*, 1016*b*, 1016*n*, etc. Some embodiments may include a number of execution units dedicated to specific functions or sets of functions. Other embodiments may include only one execution unit or one execution unit that can perform a particular function. Execution logic 1014 performs the operations specified by code instructions.

After completion of execution of the operations specified by the code instructions, back-end logic 1018 can retire the instructions of code 1004. In one embodiment, processor 1000 allows out of order execution but requires in order retirement of instructions. Retirement logic 1020 may take a variety of known forms (e.g., re-order buffers or the like). In this manner, processor 1000 is transformed during execution of code 1004, at least in terms of the output generated by the decoder, hardware registers and tables utilized by register renaming logic 1010, and any registers (not shown) modified by execution logic 1014.

Although not shown in FIG. 10, a processing element may include other elements on a chip with processor 1000. For example, a processing element may include memory control logic along with processor 1000. The processing element may include I/O control logic and/or may include I/O control logic integrated with memory control logic. The processing element may also include one or more caches. In some embodiments, non-volatile memory (such as flash memory or fuses) may also be included on the chip with processor 1000.

Referring now to FIG. 11, a block diagram is illustrated of an example mobile device 1100. Mobile device 1100 is an example of a possible computing system (e.g., a host or endpoint device) of the examples and implementations described herein. In an embodiment, mobile device 1100 operates as a transmitter and a receiver of wireless communications signals. Specifically, in one example, mobile device 1100 may be capable of both transmitting and receiving cellular network voice and data mobile services. Mobile services include such functionality as full Internet access, downloadable and streaming video content, as well as voice telephone communications.

Mobile device 1100 may correspond to a conventional wireless or cellular portable telephone, such as a handset that is capable of receiving "3G", or "third generation" cellular services. In another example, mobile device 1100 may be capable of transmitting and receiving "4G" mobile services as well, or any other mobile service.

Examples of devices that can correspond to mobile device 1100 include cellular telephone handsets and smartphones, such as those capable of Internet access, email, and instant messaging communications, and portable video receiving and display devices, along with the capability of supporting telephone services. It is contemplated that those skilled in the art having reference to this specification will readily comprehend the nature of modern smartphones and telephone handset devices and systems suitable for implementation of the different aspects of this disclosure as described herein. As such, the architecture of mobile device 1100 illustrated in FIG. 11 is presented at a relatively high level. Nevertheless, it is contemplated that modifications and alternatives to this architecture may be made and will be apparent to the reader, such modifications and alternatives contemplated to be within the scope of this description.

In an aspect of this disclosure, mobile device 1100 includes a transceiver 1102, which is connected to and in communication with an antenna. Transceiver 1102 may be a radio frequency transceiver. Also, wireless signals may be transmitted and received via transceiver 1102. Transceiver 1102 may be constructed, for example, to include analog and digital radio frequency (RF) 'front end' functionality, circuitry for converting RF signals to a baseband frequency, via an intermediate frequency (IF) if desired, analog and digital filtering, and other conventional circuitry useful for carrying out wireless communications over modern cellular frequencies, for example, those suited for 3G or 4G communications. Transceiver 1102 is connected to a processor 1104, which may perform the bulk of the digital signal processing of signals to be communicated and signals received, at the baseband frequency. Processor 1104 can provide a graphics interface to a display element 1108, for the display of text, graphics, and video to a user, as well as an input element 1110 for accepting inputs from users, such as a touchpad, keypad, roller mouse, and other examples. Processor 1104 may include an embodiment such as shown and described with reference to processor 1000 of FIG. 10.

In an aspect of this disclosure, processor 1104 may be a processor that can execute any type of instructions to achieve the functionality and operations as detailed herein. Processor 1104 may also be coupled to a memory element 1106 for storing information and data used in operations performed using the processor 1104. Additional details of an example processor 1104 and memory element 1106 are subsequently described herein. In an example embodiment, mobile device 1100 may be designed with a system-on-a-chip (SoC) architecture, which integrates many or all components of the mobile device into a single chip, in at least some embodiments.

FIG. 12 illustrates a computing system 1200 that is arranged in a point-to-point (PtP) configuration according to an embodiment. In particular, FIG. 12 shows a system where processors, memory, and input/output devices are interconnected by a number of point-to-point interfaces. Generally, one or more of the computing systems described herein may be configured in the same or similar manner as computing system 1200.

Processors 1270 and 1280 may also each include integrated memory controller logic (MC) 1272 and 1282 to communicate with memory elements 1232 and 1234. In alternative embodiments, memory controller logic 1272 and 1282 may be discrete logic separate from processors 1270 and 1280. Memory elements 1232 and/or 1234 may store various data to be used by processors 1270 and 1280 in achieving operations and functionality outlined herein.

Processors 1270 and 1280 may be any type of processor, such as those discussed in connection with other figures. Processors 1270 and 1280 may exchange data via a point-to-point (PtP) interface 1250 using point-to-point interface circuits 1278 and 1288, respectively. Processors 1270 and 1280 may each exchange data with a chipset 1290 via individual point-to-point interfaces 1252 and 1254 using point-to-point interface circuits 1276, 1286, 1294, and 1298. Chipset 1290 may also exchange data with a high-performance graphics circuit 1238 via a high-performance graphics interface 1239, using an interface circuit 1292, which could be a PtP interface circuit. In alternative embodiments, any or all of the PtP links illustrated in FIG. 12 could be implemented as a multi-drop bus rather than a PtP link.

Chipset 1290 may be in communication with a bus 1220 via an interface circuit 1296. Bus 1220 may have one or more devices that communicate over it, such as a bus bridge 1218 and I/O devices 1216. Via a bus 1210, bus bridge 1218 may be in communication with other devices such as a keyboard/mouse 1212 (or other input devices such as a touch screen, trackball, etc.), communication devices 1226 (such as modems, network interface devices, or other types of communication devices that may communicate through a computer network 1260), audio I/O devices 1214, and/or a data storage device 1228. Data storage device 1228 may store code 1230, which may be executed by processors 1270 and/or 1280. In alternative embodiments, any portions of the bus architectures could be implemented with one or more PtP links.

The computer system depicted in FIG. 12 is a schematic illustration of an embodiment of a computing system that may be utilized to implement various embodiments discussed herein. It will be appreciated that various components of the system depicted in FIG. 12 may be combined in a system-on-a-chip (SoC) architecture or in any other suitable configuration capable of achieving the functionality and features of examples and implementations provided herein.

Although this disclosure has been described in terms of certain implementations and generally associated methods, alterations and permutations of these implementations and methods will be apparent to those skilled in the art. For example, the actions described herein can be performed in a different order than as described and still achieve the desirable results. As one example, the processes depicted in the accompanying figures do not necessarily require the particular order shown, or sequential order, to achieve the desired results. In certain implementations, multitasking and parallel processing may be advantageous. Additionally, other user interface layouts and functionality can be supported. Other variations are within the scope of the following claims.

The following examples pertain to embodiments in accordance with this Specification. Example 1 is an apparatus including: a processer including on-die memory; memory including a protected region; and a memory encryption engine (MEE). The MEE may include circuitry to: receive a request for data in a particular page in the protected region of memory; access a pointer in an indirection directory, where the pointer is to point to a particular metadata page stored outside the protected region of memory, and the particular metadata page includes a first portion of security metadata for use in securing the data of the particular page; access a second portion of the security metadata associated with the particular page from the protected region of memory; and determine authenticity of the data of the particular page based on the first and second portions of the security metadata.

Example 2 may include the subject matter of example 1, where the second portion of the security metadata includes layers of a replay integrity tree associated with the particular page, and authenticity of the data is determined based on the replay integrity tree.

Example 3 may include the subject matter of example 2, where a root of the replay integrity tree is stored in the on-die memory.

Example 4 may include the subject matter of example 3, where determining the authenticity of the data includes performing a walk of the replay integrity tree and the walk is based at least in part on the first portion of the security metadata.

Example 5 may include the subject matter of any one of examples 1-4, where the first portion of the security metadata includes a message authentication code (MAC) for the data of the particular page.

Example 6 may include the subject matter of example 5, where the first portion of the security metadata further includes a version seed associated with the particular page, and the version seed is to be encrypted for use in generating a ciphertext version of plain text data of the particular page.

Example 7 may include the subject matter of example 6, where the ciphertext version is generated using counter mode encryption.

Example 8 may include the subject matter of any one of examples 1-7, where the particular page is one of a group of pages in memory and the particular metadata page includes security metadata for each of the group of pages.

Example 9 may include the subject matter of example 8, where the security metadata for each of the group of pages includes a respective MAC and version seed for each page in the group of pages.

Example 10 may include the subject matter of any one of examples 1-9, where the indirection directory is stored in stolen memory inaccessible to system software.

Example 11 may include the subject matter of any one of examples 1-10, where the particular metadata page is one of a plurality of metadata pages allocated in memory and the indirection directory includes pointers for each one of the plurality of metadata pages.

Example 12 may include the subject matter of any one of examples 1-11, where the indirection directory includes a respective pointer for each page of memory to point to a respective metadata page when the corresponding page is designated as protected.

Example 13 may include the subject matter of any one of examples 1-12, where the MEE is further to decrypt and encrypt data in the protected region of memory through counter mode encryption based on the first portion of the security metadata.

Example 14 is a machine accessible storage medium having instructions stored thereon, the instructions when executed on a machine, cause the machine to: identify a particular page in computer memory to be secured; allocate a metadata page in computer memory to store a first portion of security metadata for use in securing the particular page, where a second portion of the security metadata is to be pre-allocated in a secured portion of the computer memory; and enter an address of the metadata page in a particular pointer in an indirection directory, where the indirection directory is pre-allocated in the secured portion of the computer memory, and the particular pointer is mapped to an address of the particular page.

Example 15 may include the subject matter of example 14, where the particular page is to be included in the secured portion of the computer memory and the metadata page is to be stored outside the secured portion of the computer memory.

Example 16 may include the subject matter of any one of examples 14-15, where the metadata page is to be allocated dynamically in response to identifying that the particular page is to be secured.

Example 17 may include the subject matter of any one of examples 14-16, where the particular page is to be secured for use with a secure enclave.

Example 18 may include the subject matter of any one of examples 14-17, where the instructions, when executed, further cause the machine to check whether the metadata page has been allocated, the metadata page is allocated based on allocation of another page of secured memory, and the other page of the secured memory and the particular page are included in a group of memory pages associated with the metadata page.

Example 19 is a system including: a processor; a memory including a secured region, where the secured region stores an indirection directory and first security metadata to implement at least a portion of a replay integrity tree; and a memory encryption engine (MEE). The MEE may include circuitry to: receive a request for data in a particular page of memory in the secured region; access a pointer in the indirection directory, where the pointer is to point to a particular metadata page of memory outside the secured region, and the particular metadata page includes second security metadata for use in securing the data of the particular page; retrieve the second security metadata from the particular metadata page; and determine authenticity of the data of the particular page based on the first and second security metadata.

Example 20 may include the subject matter of example 19, further including system software executable by the processor to: cause the particular page of memory to be included in the secured region; allocate the particular metadata page responsive to inclusion of the particular page in the secured region; and update the pointer to indicate an address of the particular metadata page, where the pointer is associated with an address of the particular page.

Example 21 may include the subject matter of example 20, where the particular page is to be included in the secured region of the memory and the metadata page is to be stored outside the secured region of the memory.

Example 22 may include the subject matter of any one of examples 20-21, where the particular metadata page is to be allocated dynamically in response to identifying that the particular page is to be secured.

Example 23 may include the subject matter of any one of examples 20-22, where the particular page is to be secured for use with a secure enclave.

Example 24 may include the subject matter of any one of examples 20-23, where the system software, when executed, is further to check whether the metadata page has been allocated, the metadata page is allocated based on allocation of another page of secured memory, and the other page of the secured memory and the particular page are included in a group of memory pages associated with the metadata page.

Example 25 may include the subject matter of any one of examples 19-24, where a root of the replay integrity tree is stored in on-die memory.

Example 26 may include the subject matter of any one of examples 19-25, where determining the authenticity of the data includes performing a walk of the replay integrity tree and the walk is based at least in part on the first and second security metadata.

Example 27 may include the subject matter of any one of examples 19-26, where the second security metadata includes a message authentication code (MAC) for the data of the particular page.

Example 28 may include the subject matter of any one of examples 19-27, where the second security metadata includes a version seed associated with the particular page, and the version seed is to be encrypted for use in generating a ciphertext version of plain text data of the particular page.

Example 29 may include the subject matter of example 28, where the ciphertext version is generated using counter mode encryption.

Example 30 may include the subject matter of any one of examples 19-29, where the particular page is one of a group of pages in memory and the particular metadata page includes security metadata for each of the group of pages.

Example 31 may include the subject matter of example 30, where the security metadata for each of the group of pages includes a respective MAC and version seed for each page in the group of pages.

Example 32 may include the subject matter of any one of examples 19-31, where the indirection directory is stored in stolen memory inaccessible to system software.

Example 33 may include the subject matter of any one of examples 19-32, where the MEE is further to decrypt and encrypt data in the protected region of memory through counter mode encryption based on the second security metadata.

Example 34 is a method including: receiving a request for data in a particular page in the protected region of memory; accessing a pointer in an indirection directory, where the pointer is to point to a particular metadata page stored outside the protected region of memory, and the particular metadata page includes a first portion of security metadata for use in securing the data of the particular page; accessing a second portion of the security metadata associated with the particular page from the protected region of memory; and determining authenticity of the data of the particular page based on the first and second portions of the security metadata.

Example 35 may include the subject matter of example 34, where the second portion of the security metadata includes layers of a replay integrity tree associated with the particular page, and authenticity of the data is determined based on the replay integrity tree.

Example 36 may include the subject matter of example 35, where a root of the replay integrity tree is stored in the on-die memory.

Example 37 may include the subject matter of example 36, where determining the authenticity of the data includes performing a walk of the replay integrity tree and the walk is based at least in part on the first portion of the security metadata.

Example 38 may include the subject matter of any one of examples 34-37, where the first portion of the security metadata includes a message authentication code (MAC) for the data of the particular page.

Example 39 may include the subject matter of example 38, where the first portion of the security metadata further includes a version seed associated with the particular page, and the version seed is to be encrypted for use in generating a ciphertext version of plain text data of the particular page.

Example 40 may include the subject matter of example 39, where the ciphertext version is generated using counter mode encryption.

Example 41 may include the subject matter of any one of examples 34-40, where the particular page is one of a group of pages in memory and the particular metadata page includes security metadata for each of the group of pages.

Example 42 may include the subject matter of example 41, where the security metadata for each of the group of pages includes a respective MAC and version seed for each page in the group of pages.

Example 43 may include the subject matter of any one of examples 34-42, where the indirection directory is stored in stolen memory inaccessible to system software.

Example 44 may include the subject matter of any one of examples 34-43, where the particular metadata page is one of a plurality of metadata pages allocated in memory and the indirection directory includes pointers for each one of the plurality of metadata pages.

Example 45 may include the subject matter of any one of examples 34-44, where the indirection directory includes a respective pointer for each page of memory to point to a respective metadata page when the corresponding page is designated as protected.

Example 46 may include the subject matter of any one of examples 34-45, where the MEE is further to decrypt and encrypt data in the protected region of memory through counter mode encryption based on the first portion of the security metadata.

Example 47 is system including means to perform the method of any one of examples 34-46.

Example 48 is a method including: identifying a particular page in computer memory to be secured; allocating a metadata page in computer memory to store a first portion of security metadata for use in securing the particular page, where a second portion of the security metadata is to be pre-allocated in a secured portion of the computer memory; and entering an address of the metadata page in a particular pointer in an indirection directory, where the indirection directory is pre-allocated in the secured portion of the computer memory, and the particular pointer is mapped to an address of the particular page.

Example 49 may include the subject matter of example 48, where the particular page is to be included in the secured portion of the computer memory and the metadata page is to be stored outside the secured portion of the computer memory.

Example 50 may include the subject matter of any one of examples 48-49, where the metadata page is to be allocated dynamically in response to identifying that the particular page is to be secured.

Example 51 may include the subject matter of any one of examples 48-50, where the particular page is to be secured for use with a secure enclave.

Example 52 may include the subject matter of any one of examples 48-51, further including checking whether the metadata page has been allocated, the metadata page is allocated based on allocation of another page of secured memory, and the other page of the secured memory and the particular page are included in a group of memory pages associated with the metadata page.

Example 53 is a system including means to perform the method of any one of examples 48-52.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results.

What is claimed is:

1. An apparatus comprising:
   a processer;
   on-die memory comprising a protected region, wherein the protected region stores a root layer of a replay integrity tree;
   a memory encryption engine (MEE) comprising circuitry to:
   receive a request for data in a particular page in the protected region of memory, wherein the particular page is associated with the replay integrity tree;
   access a pointer in an indirection directory, wherein the pointer is to point to a particular metadata page stored outside the protected region of the on-die memory, and the particular metadata page comprises a first portion of security metadata for use in securing the data of the particular page and the first portion of security metadata comprises a layer of the replay integrity tree other than the root layer, wherein at least a portion of the indirection directory is stored in the protected region of the on-die memory and the portion of the indirection directory comprises the pointer;
   access a second portion of the security metadata associated with the particular page from the protected region of on-die memory based on information in the particular metadata page, wherein the second portion of the security metadata comprises layers of the replay integrity tree associated with the particular page and the second portion of the security metadata is stored outside the protected region of the on-die memory; and
   determine authenticity of the data of the particular page based on the replay integrity tree stored in the first and second portions of the security metadata.

2. The apparatus of claim 1, wherein a root of the replay integrity tree is stored in the on-die memory.

3. The apparatus of claim 1, wherein determining the authenticity of the data comprises performing a walk of the replay integrity tree and the walk is based at least in part on the first portion of the security metadata.

4. The apparatus of claim 1, wherein another pointer in the indirection directory points to a third portion of security metadata and the third portion of security metadata comprises a message authentication code (MAC) for the data of the particular page in the protected memory.

5. The apparatus of claim 4, wherein the third portion of the security metadata further comprises a version seed associated with the other page, and the version seed is to be encrypted for use in generating a ciphertext version of plain text data of the other page.

6. The apparatus of claim 5, wherein the ciphertext version is generated using counter mode encryption.

7. The apparatus of claim 1, wherein the particular page is one of a group of pages in memory and the particular metadata page comprises security metadata for each of the group of pages.

8. The apparatus of claim 7, wherein the security metadata for each of the group of pages comprises a respective MAC and version seed for each page in the group of pages.

9. The apparatus of claim 1, wherein the particular metadata page is one of a plurality of metadata pages allocated in memory and the indirection directory comprises pointers for each one of the plurality of metadata pages.

10. The apparatus of claim 1, wherein the indirection directory comprises a respective pointer for each page of memory to point to a respective metadata page when the corresponding page is designated as protected.

11. The apparatus of claim 1, wherein the MEE is further to decrypt and encrypt data in the protected region of memory through counter mode encryption based on the first portion of the security metadata.

12. At least one non-transitory machine accessible storage medium having instructions stored thereon, the instructions when executed on a machine, cause the machine to:
    identify a particular page in computer memory to be secured;
    allocate a metadata page in computer memory to store a first portion of security metadata for use in securing the particular page, wherein a second portion of the security metadata is to be pre-allocated in a secured portion of the computer memory, wherein the secured portion of the computer memory comprises on-die memory; and
    enter an address of the metadata page in a particular pointer in an indirection directory, wherein the indirection directory is pre-allocated in the secured portion of the computer memory, and the particular pointer is mapped to an address of the particular page,
    wherein the first portion of the metadata is to be stored outside the secured portion of the computer memory, the first portion of security metadata is to comprise a root of a replay integrity tree associated with the particular page, and the second portion of the security metadata comprises layers of the replay integrity tree associated with the particular page, wherein at least a portion of the replay integrity tree is stored in the secured portion of the computer memory and another portion of the replay integrity tree is stored outside the secured portion of the computer memory.

13. The storage medium of claim 12, wherein the particular page is to be included in the secured portion of the computer memory.

14. The storage medium of claim 12, wherein the metadata page is to be allocated dynamically in response to identifying that the particular page is to be secured.

15. The storage medium of claim 12, wherein the particular page is to be secured for use with a secure enclave.

16. The storage medium of claim 12, wherein the instructions, when executed, further cause the machine to check whether the metadata page has been allocated, the metadata page is allocated based on allocation of another page of secured memory, and the other page of the secured memory and the particular page are included in a group of memory pages associated with the metadata page.

17. A system comprising:
    a processor;
    a memory comprising a secured region, wherein the secured region stores at least a portion of an indirection directory and first security metadata to implement at least a root of a replay integrity tree; and a memory encryption engine (MEE) comprising circuitry to:
- receive a request for data in a particular page of memory in the secured region;
- access a pointer in the indirection directory, wherein the pointer is to point to a particular metadata page of memory outside the secured region, the particular metadata page comprises second security metadata, the second security metadata comprises layers of the replay integrity tree other than the root of the replay integrity tree, and the replay integrity tree is for use in securing the data of the particular page;
- retrieve the second security metadata from the particular metadata page; and
- determine authenticity of the data of the particular page based on the replay integrity tree stored in the first and second security metadata.

18. The system of claim 17, further comprising system software executable by the processor to:
- cause the particular page of memory to be included in the secured region;
- allocate the particular metadata page responsive to inclusion of the particular page in the secured region; and
- update the pointer to indicate an address of the particular metadata page, wherein the pointer is associated with an address of the particular page.

* * * * *